(12) United States Patent
Orsino et al.

(10) Patent No.: US 11,956,660 B2
(45) Date of Patent: Apr. 9, 2024

(54) TRIGGERING MEASUREMENTS BEFORE THE COMPLETION OF CONNECTION RESUMPTION

(71) Applicant: Telefonaktiebolaget LM Ericsson (publ), Stockholm (SE)

(72) Inventors: Antonino Orsino, Kirkkonummi (FI); Oumer Teyeb, Solna (SE); Jens Bergqvist, Linköping (SE); Osman Nuri Can Yilmaz, Espoo (FI); Icaro L. J. Da Silva, Solna (SE); Ali Nader, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 198 days.

(21) Appl. No.: 17/429,820

(22) PCT Filed: Jan. 10, 2020

(86) PCT No.: PCT/SE2020/050015
§ 371 (c)(1),
(2) Date: Aug. 10, 2021

(87) PCT Pub. No.: WO2020/167192
PCT Pub. Date: Aug. 20, 2020

(65) Prior Publication Data
US 2022/0132348 A1    Apr. 28, 2022

Related U.S. Application Data

(60) Provisional application No. 62/804,608, filed on Feb. 12, 2019.

(51) Int. Cl.
*H04W 24/10* (2009.01)
*H04W 76/19* (2018.01)
(Continued)

(52) U.S. Cl.
CPC .......... *H04W 24/10* (2013.01); *H04W 76/19* (2018.02); *H04W 76/27* (2018.02); *H04W 76/28* (2018.02)

(58) Field of Classification Search
None
See application file for complete search history.

(56) References Cited

U.S. PATENT DOCUMENTS

2014/0066107 A1* 3/2014 Schmidt ................ H04W 68/00
455/458
2018/0084466 A1* 3/2018 Zeller ............. H04W 36/00837
(Continued)

FOREIGN PATENT DOCUMENTS

CN      201810844807    *  8/2018
WO      2011090328 A2      7/2011
(Continued)

OTHER PUBLICATIONS

Author Unknown, Further considerations on early reporting of SCell candidates for euCA, pp. 1-4, Aug. 24 (Year: 2018).*
(Continued)

*Primary Examiner* — Christopher M Crutchfield
(74) *Attorney, Agent, or Firm* — Murphy, Bilak & Homiller, PLLC

(57) ABSTRACT

Systems and methods for triggering measurements before the completion of connection resumption are provided. In some embodiments, a method performed by a wireless device for performing measurements where a current Radio Resource Control (RRC) status is: IDLE or INACTIVE. The method includes monitoring for a potential reception of a downlink message in a cell that the wireless device is camping on; detecting, based upon the reception of the downlink message, information regarding performing measurements; performing measurements based on the information regarding performing the measurements; and reporting
(Continued)

the measurement results. In some embodiments, the message is a paging message or a message multiplexed with the paging message. In this way, latency might be reduced to start performing measurements. This early availability of measurements at the target cell might increase the speed at which the wireless device acquires wireless connections such as Carrier Aggregation (CA) or Dual Connectivity (DC) connections.

18 Claims, 17 Drawing Sheets

(51) Int. Cl.
*H04W 76/27* (2018.01)
*H04W 76/28* (2018.01)

(56) References Cited

U.S. PATENT DOCUMENTS

| | | | |
|---|---|---|---|
| 2019/0014492 A1 | 1/2019 | Kim et al. | |
| 2019/0037425 A1* | 1/2019 | Hong | H04W 72/23 |
| 2019/0223041 A1* | 7/2019 | Luo | H04W 24/08 |
| 2020/0120491 A1* | 4/2020 | Mildh | H04W 80/08 |
| 2021/0045000 A1* | 2/2021 | Dalsgaard | H04W 76/10 |
| 2021/0153058 A1* | 5/2021 | Zheng | H04W 24/02 |
| 2021/0360459 A1* | 11/2021 | Zhang | H04W 24/10 |

FOREIGN PATENT DOCUMENTS

| | | | |
|---|---|---|---|
| WO | PCT/CN2017/097560 | * | 3/2017 |
| WO | 2018228038 A1 | | 12/2018 |
| WO | 2018232124 A1 | | 12/2018 |
| WO | 2018236172 A1 | | 12/2018 |

OTHER PUBLICATIONS

Author Unknown, CR introducing enhanced utilization of CA and idle mode measurements for early reporting, pp. 1-3, Aug. 24 (Year: 2018).*
3GPP , "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.4.0, Dec. 2018, 1-363.
3GPP , "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.4.0, Dec. 2018, 1-933.
3GPP , "3rd Generation Partnership Project; Technical Specification Group Radio Access Network; Evolved Universal Terrestrial Radio Access (E-UTRA); Requirements for support of radio resource management (Release 15)", 3GPP TS 36.133 V15.5.0, Dec. 2018, 1-3563.
BGPP , "3rd Generation Partnership Project; Technical Specification Group Radio Access Network; Evolved Universal Terrestrial Radio Access (E-UTRA); User Equipment (UE) procedures in idle mode (Release 15)", 3GPP TS 36.304 V15.2.0, Dec. 2018, pp. 1-55.
3GPP , "3rd Generation Partnership Project; Technical Specification Group Radio Access Network; NR; Physical layer procedures for control (Release 15)", 3GPP TS 38.213 V15.4.0, Dec. 2018, 1-104.
3GPP , "3rd Generation Partnership Project; Technical Specification Group Radio Access Network; NR; Radio Resource Control (RRC) protocol specification (Release 15)", TS 38.331 V15.4.0, Dec. 2018, 1-474.
3GPP , "3rd Generation Partnership Project; Technical Specification Group Radio Access Network; NR; Requirements for support of radio resource management (Release 15)", 3GPP TS 38.133 V15. 4.0, Dec. 2018, 1-876.
3GPP , "3rd Generation Partnership Project; Technical Specification Group Radio Access Network; NR; User Equipment (UE) procedures in Idle mode and RRC Inactive state (Release 15)", 3GPP TS 38.304 V15.2.0, Dec. 2018, 1-28.
Ericsson , "Measurements for early setup of CA or DC", 3GPP TSG-RAN WG2#105, R2-1900694, Athens, Greece, Feb. 25-Mar. 1, 2019, 1-4.
Ericsson , "Reporting early measurements before RRC Resume", 3GPP TSG-RAN WG2#105bis, R2-1904481, Xi'an, China, Apr. 8-12, 2019, 1-3.
Ericsson , "Signalling of early measurements for CA/DC setup", 3GPP TSG-RAN WG2 #105, R2-1900693, Athens, Greece, Feb. 25-Mar. 1, 2019, 1-9.
Qualcomm Incorporated , "Fast SCell Configuration and Activation Through network assisted RRC_Idle mode measurements", 3GPP TSG-RAN2 Meeting #99, R2-1710152 (resubmission of R2-1707788), Prague, Czech Republic, Oct. 9-13, 2017, 1-6.

* cited by examiner

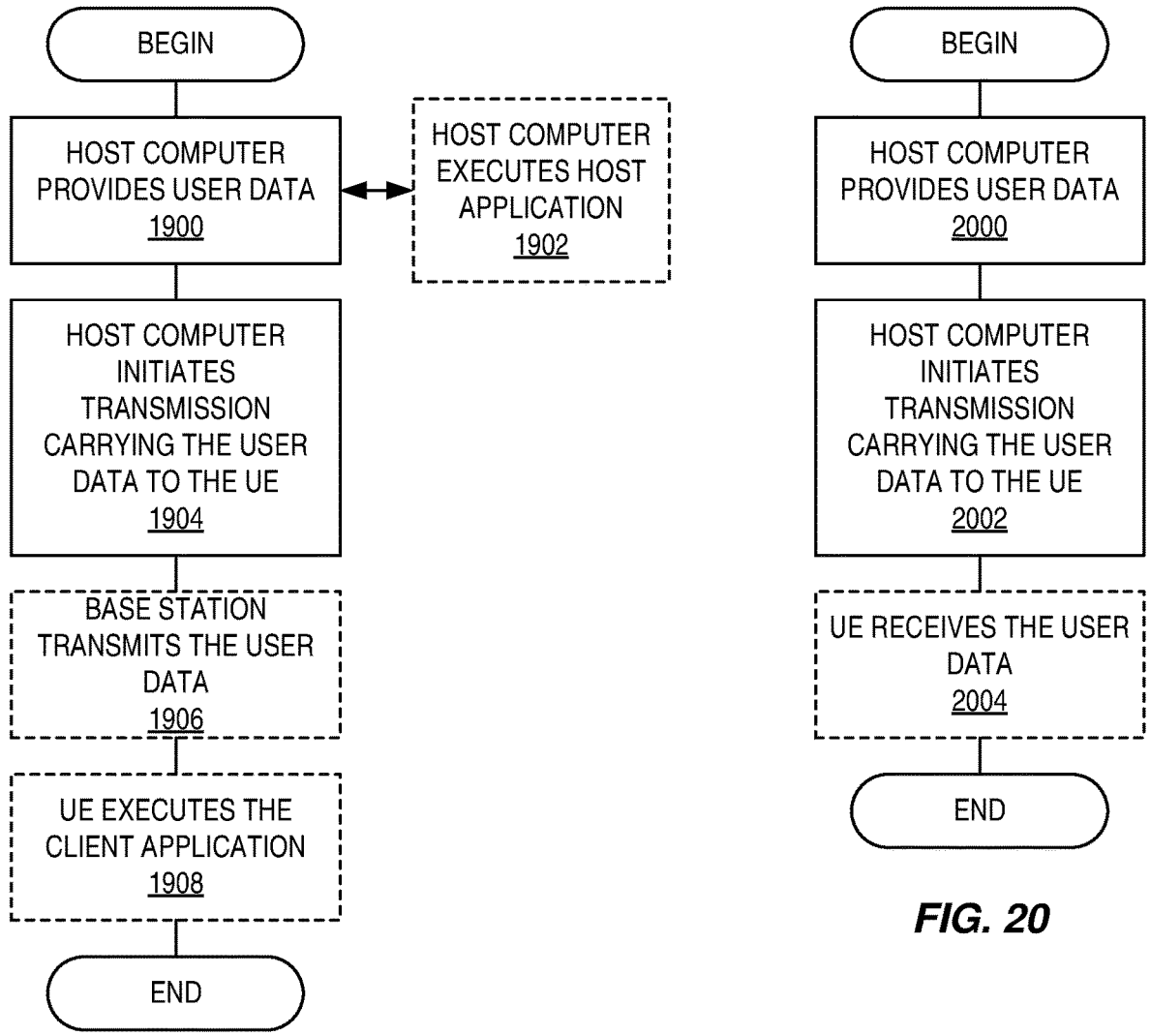

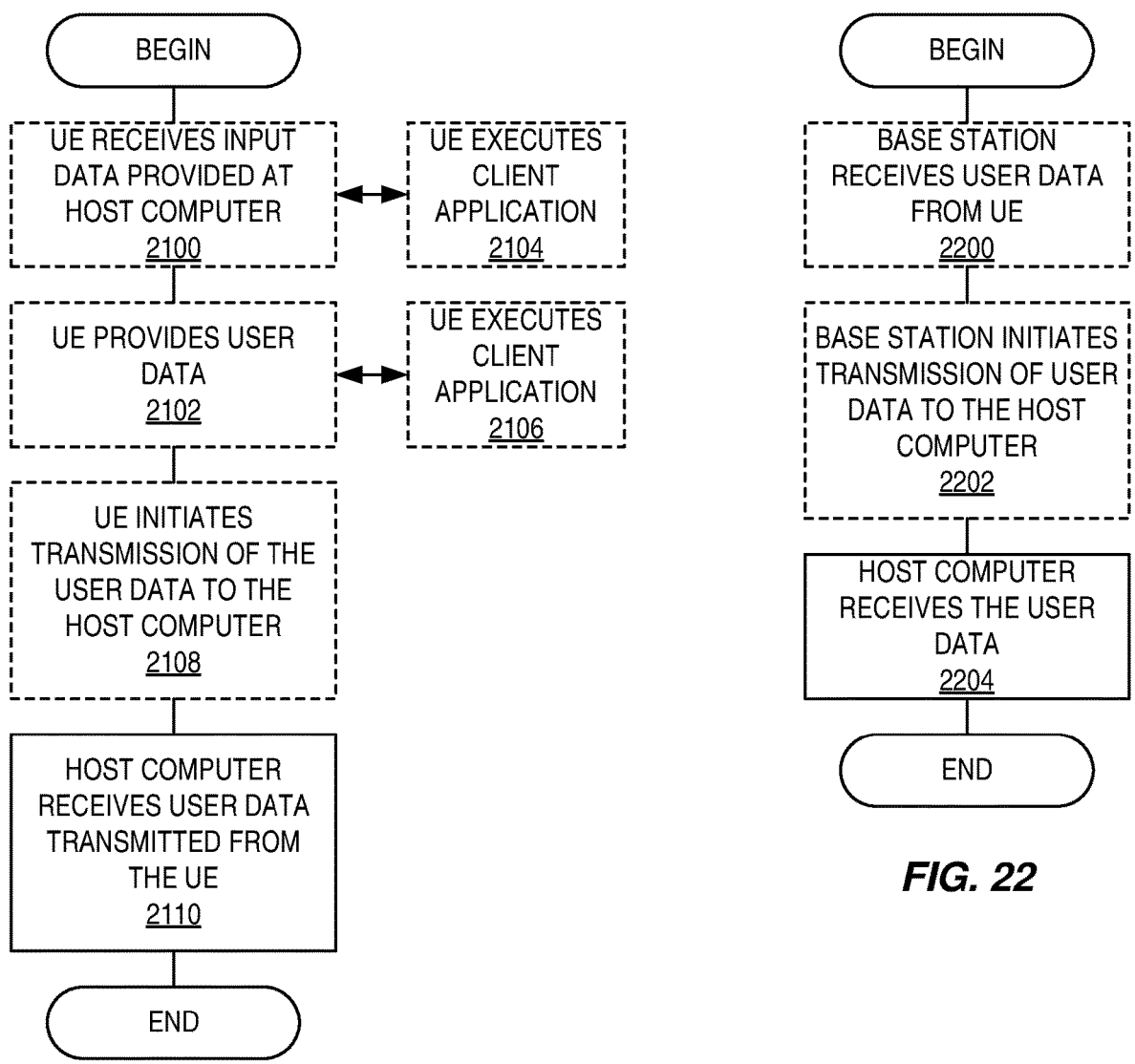

TRIGGERING MEASUREMENTS BEFORE THE COMPLETION OF CONNECTION RESUMPTION

RELATED APPLICATIONS

This application claims the benefit of provisional patent application Ser. No. 62/804,608, filed Feb. 12, 2019, the disclosure of which is hereby incorporated herein by reference in its entirety.

TECHNICAL FIELD

The current disclosure relates to performing measurements in a communications network.

BACKGROUND

A wireless device can sometimes have multiple wireless connections. In some instances, this can be via Carrier Aggregation (CA) or Dual Connectivity (DC). In order for the wireless device to be configured with these connections, appropriate measurements are needed. When these measurements are not yet available, the time to set up the multiple wireless connections is extended. Therefore, improved systems and methods for performing measurements are needed.

SUMMARY

Systems and methods for triggering measurements before the completion of connection resumption are provided. In some embodiments, a method performed by a wireless device for performing measurements where a current Radio Resource Control (RRC) status is: IDLE or INACTIVE. The method includes monitoring for a potential reception of a downlink message in a cell that the wireless device is camping on; detecting, based upon the reception of the downlink message, information regarding performing measurements; performing measurements based on the information regarding performing the measurements; and reporting the measurement results. In this way, latency might be reduced to start performing measurements. This early availability of measurements at the target cell might increase the speed at which the wireless device acquires wireless connections such as Carrier Aggregation (CA) or Dual Connectivity (DC) connections.

In some embodiments, a method performed by a base station for enabling measurements for a wireless device where a current RRC status of the wireless device is: IDLE or INACTIVE. The method includes determining whether or not to enable measurements for the wireless device; sending an indication to start measurements to the wireless device camping on a cell of the base station; and receiving measurement results from the wireless device performed before the reception of a resume message.

In some embodiments, the potential reception of a message is a potential reception of one of the group consisting of: a paging message; and a message multiplexed with the paging message. In some embodiments, the potential reception of a message is a potential reception of one of the group consisting of: a Physical Downlink Control Channel (PDCCH) message; and a Physical Downlink Shared Channel (PDSCH) message.

In some embodiments, the information regarding performing measurements comprises an indication to resume measurements according to a stored configuration in the wireless device. In some embodiments, the stored configuration is stored in a User Equipment (UE) Context.

In some embodiments, the information regarding performing measurements comprises a measurement configuration that indicates that the wireless device shall perform new measurements according to the configuration received.

In some embodiments, the measurement configuration provided comprises one or more of the group consisting of: one or more lists of measurement objects; one or more report configurations; one or more measurement identifiers; and associations between these.

In some embodiments, the method also includes, if the received indication was to restore the measurement configuration, restoring the stored measurement configuration.

In some embodiments, the method also includes, if a measurement configuration was included, applying the received measurement configuration on top of the stored measurement configuration.

In some embodiments, applying the received measurement configuration on top of the stored measurement configuration comprises one or more of the group consisting of: applying the received measurement configuration as a delta of the stored measurement configuration; and applying the received measurement configuration as a full configuration. In some embodiments, the delta comprises one of the group consisting of: an addition; and a removal.

In some embodiments, whether the received measurement configuration is applied as a delta or the received measurement configuration is applied as a full configuration is based on a need code structure in a MeasConfig Information Element (IE).

In some embodiments, the measurements are performed before security is activated and the measurement results are reported after security is activated.

In some embodiments, the wireless device and/or the base station operates in a New Radio (NR) communications network.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 19 is a flowchart illustrating a method implemented in a communication system according to some embodiments of the present disclosure; and FIGS. 20-22 are flowcharts illustrating methods implemented in a communication system according to some embodiments of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 1:
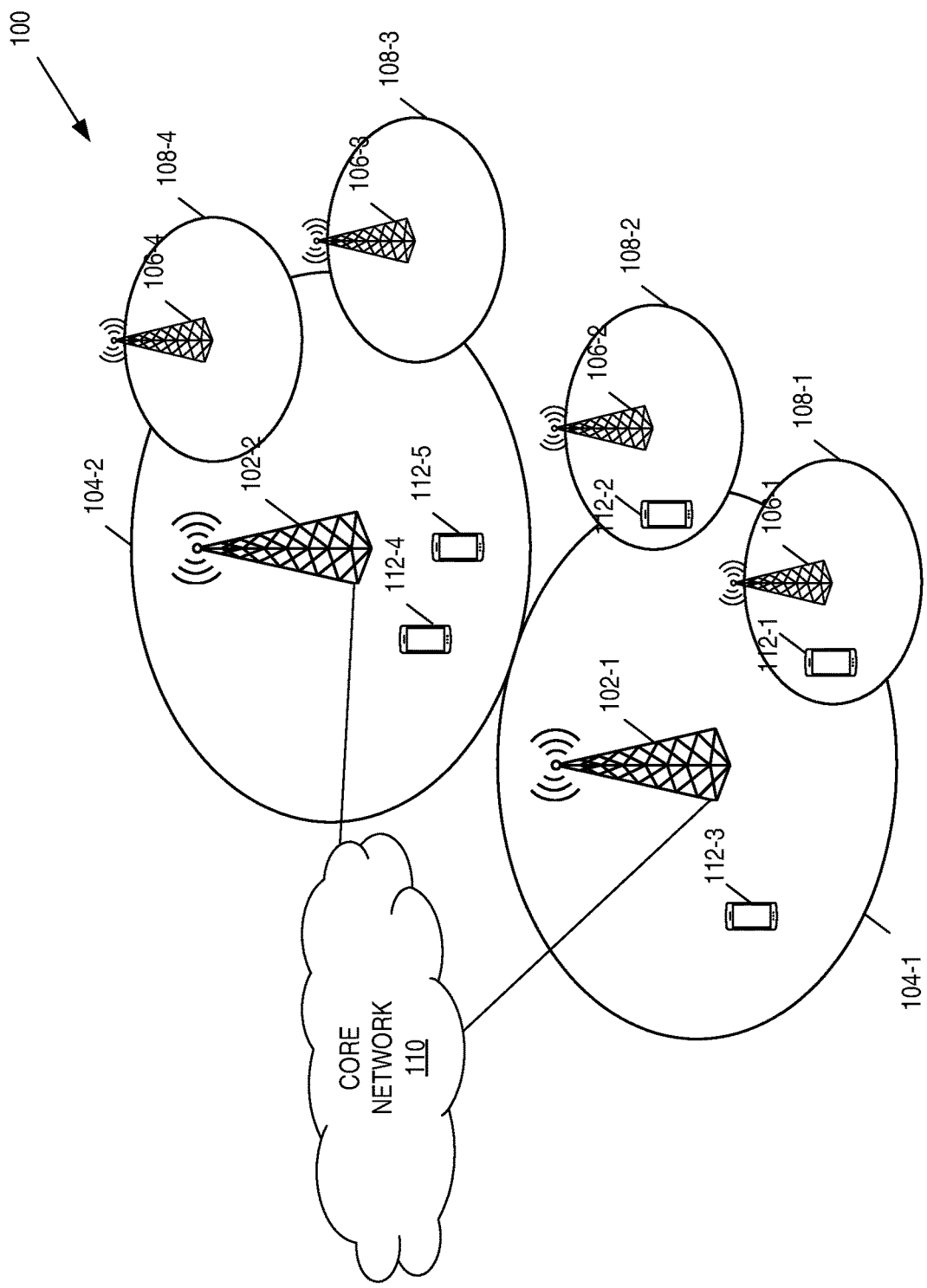
FIG. 1 illustrates one example of a cellular communications network, according to some embodiments of the present disclosure.

FIG. 1 illustrates one example of a cellular communications network 100 according to some embodiments of the present disclosure. In the embodiments described herein, the cellular communications network 100 is a 5G NR network. In this example, the cellular communications network 100 includes base stations 102-1 and 102-2, which in LTE are referred to as eNBs and in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

As stated earlier, DC is standardized for both LTE and Evolved Universal Terrestrial Radio Access (E-UTRA)-NR DC (EN-DC).

LTE DC and EN-DC are designed differently when it comes to which nodes control what. Basically, there are two options:

1. Centralized solution (like LTE-DC),
2. Decentralized solution (like EN-DC).

Figure 2:
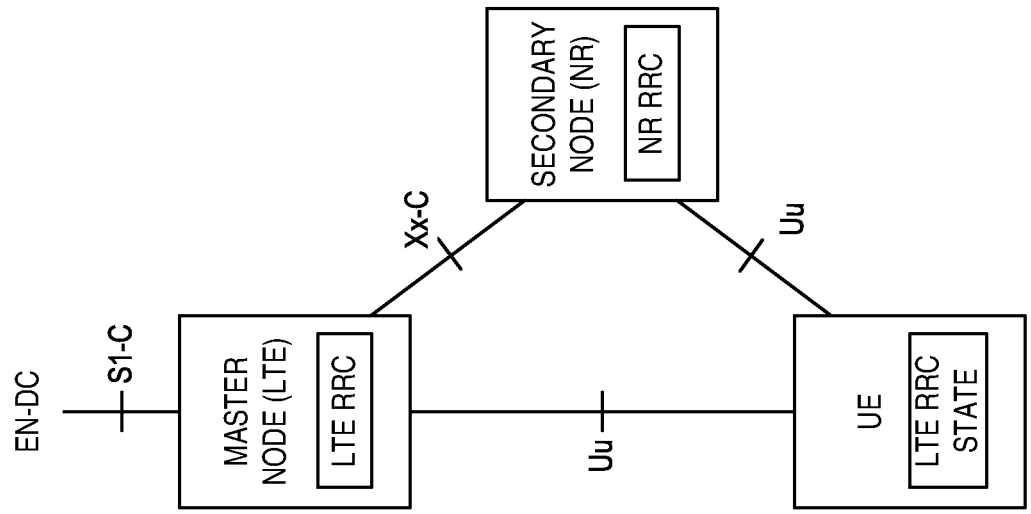
FIG. 2 illustrates the schematic control plane architecture for Long Term Evolution (LTE) Dual Connectivity (DC) and E-UTRAN New Radio-Dual Connectivity (EN-DC), according to some other embodiments of the present disclosure.
Figure 2:
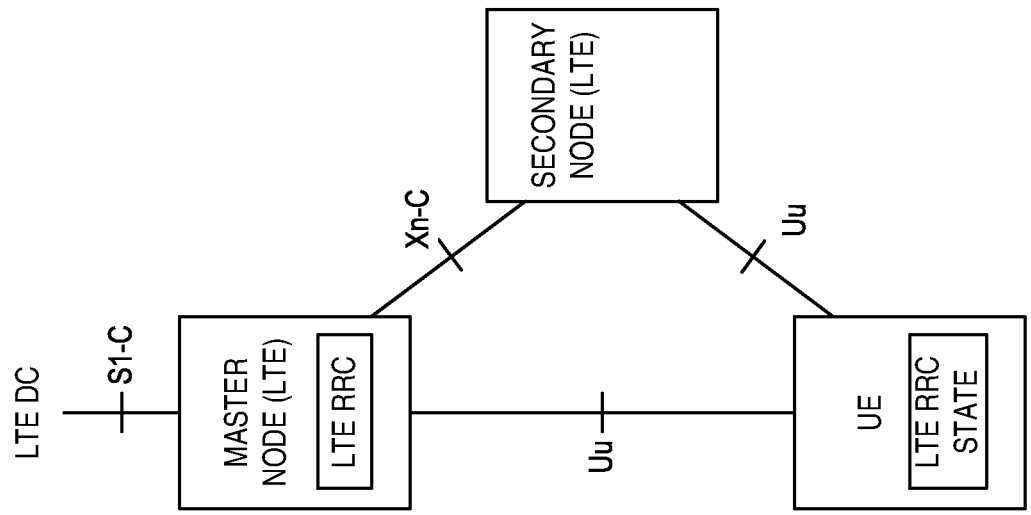

FIG. 2 shows the schematic control plane architecture for LTE DC and EN-DC. The main difference here is that in EN-DC, the Secondary Node (SN) has a separate RRC entity (NR RRC). This means that the SN can control the UE also; sometimes without the knowledge of the Master Node (MN) but often the SN needs to coordinate with the MN. In LTE-DC, the RRC decisions are always coming from the MN (MN to UE). Note however, the SN still decides the configuration of the SN, since it is only the SN itself that has knowledge of what kind of resources, capabilities etc. the SN have.

Below two different DC specifications and their RRC messages are discussed in more detail.

Figure 3:
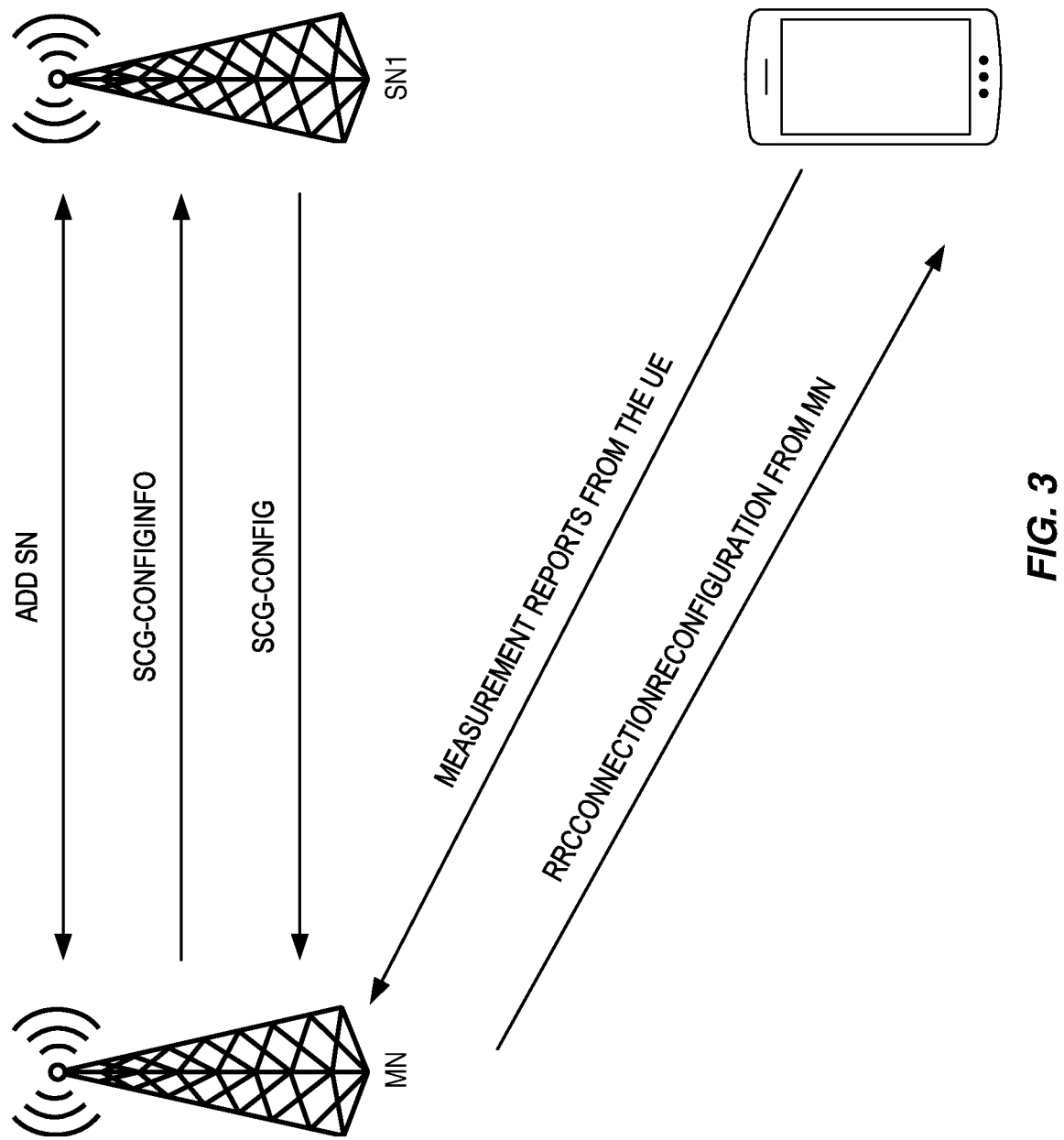
FIG. 3 is an overview of the LTE DC configurations, according to some embodiments of the present disclosure.

When the MeNB decides to request a SeNB Addition, the MeNB indicates within a Secondary Cell Group (SCG)-ConfigInfo (see, e.g., 36.300, p105) the Master Cell Group (MCG) configuration and the entire UE capabilities for UE capability coordination as well as the latest measurement results for the SCG cell(s) requested to be added, see FIG. 3 which is an overview of the LTE DC configurations. The SN responds an acknowledgement with a SCG-Config and the latest measConfig to the MeNB. If the MeNB accepts the SCG-Config configurations, it sends this to the UE as well as the UE measurement configurations (MeasConfig) in the RRCConnectionReconfiguration message to the UE.

The MeNB cannot change the SCG-Config from the SeNB, just accept or reject. The reason for this is that the MeNB is not fully aware of the available resources and capabilities of the SeNB. Thus, if the MeNB modifies the SCG-Config can lead to the case that the UE utilizes incorrect resources. In practice, the measurement configuration is controlled by the MN. Note also that in LTE-DC centralized solution the UE's measurement report is sent to the MN only.

The second option is to use a decentralized option, which is used by EN-DC. This means that the SN can directly configure the UE with measurement.

In EN-DC, the main reason to have decentralized measurement configurations was latency requirements. Thus, by supporting a special Signaling Radio Bearer (SRB) (called SRB3) for the SN node (NR) which allows the SN to configure the measurement separately (without involving the MN), the SN can speed up the measurements and measurement configurations. The thinking here is that SRB3 (using NR radio) may allow faster transmission than the corresponding LTE SRBs. Also, the backhaul link between MN and SN may be congested which could negatively affect both the measurement reporting and new measurement configurations.

Thus, sending the UE measurement report directly to the concerned node (MN or SN) can speed up the necessary action (e.g., switch node/add node). Another reason to have decentralized measurements is that LTE and NR use slightly different RRC and different mobility, which also makes it convenient to split the responsibility.

The decentralized EN-DC solution option includes measurement capability coordination. According to the latest 3GPP agreement the SN shall inform the MN every time it changes which carrier frequencies the UE shall measure on. The measurement capability coordination is necessary to not exceed the number of carriers the UE can measure (and also for the gap coordination, see below in section 2.1.1.2.1). If MN and SN configure more carriers than the UE can measure on, the UE probably will randomly ignore one or more carriers for measurements. In the worst case, these ignored carriers may be the most important carriers to measure on.

If the SN receives from the MN a new value for the maximum number of frequency layers or reporting configurations, and it has already configured all the allowed measurements or reporting configurations based on the previous maximum values, it releases the required number of measurements or reporting configurations to comply with the new limit.

It has now been explained why it is important to coordinate the measured frequency carriers. But it was also mentioned above that this is used to coordinate the measurement gaps. To understand why it is important to also coordinate the measurement gaps between MN and SN, it needs to be understood how the measurements in EN-DC works in more detail in section 2.1.1.2.1.

EN-DC may use both "LTE frequencies" and very high 5G frequencies. 3GPP distinguishes between Frequency Range 1 (FR1) and Frequency Range 2 (FR2) frequencies. FR1 is below 6 GHz and FR2 is above 24 GHz. The reason this is done like this is because of different UE capabilities. Some more advanced UEs can receive data on FR1 and measure on FR2 simultaneously (and vice versa) while some cannot measure on FR1 and receive data on FR2 at the same time (and vice versa).

To be able to measure on any frequency (FR1 or FR2) the UE is configured with a so called "gap", i.e., a certain time when UE does not receive any data on this frequency and can focus on measuring on other cells in this frequency range. If UE can receive data on FR1 and measure on FR2 simultaneously (and vice versa), the "gap" is called per-FR gap. If a UE cannot measure on FR1 and receive data on FR2 simultaneously (and vice versa) it is called per-UE gap. The most efficient way is always to configure per-FR gap, because per-UE gap will influence the scheduling of all serving cells and consequently both FR1 and FR2 data will be interrupted then, i.e., all data transmission will be impacted for a short period for per-UE gap measurements.

Radio Access Network (RAN)2 has agreed that network can choose either per-UE gap or per-FR gap for a UE. As said earlier, both MN and SN can configure the UE with measurement gaps. Thus, some gap coordination is needed. This gap coordination is a bit tricky, and perhaps not absolutely necessary to understand for this IvD but for completeness mentioned here.

In general, the MN configures the gap to the UE if the UE is per-UE capable. Thus, the MN needs to know the SN frequencies in order to calculate a suitable gap also for the SN, and then send this gap configuration to the SN. SN can send the FR1/FR2 frequencies to MN via CG-Config.

If the UE is capable of per FR1/FR2 gaps, it is decided that the MN configures the FR1 gaps and the SN configures the FR2 gaps. However, for the per FR1/FR2 gap case, the MN and SN need to coordinate the gaps, so they don't overlap.

For either per-UE gap or per-LTE/FR1 gap, MN transmits the gap pattern to SN via CG-ConfigInfo (CG-ConfigInfo is the NR name of the SCG-Config in LTE).

Figure 4:
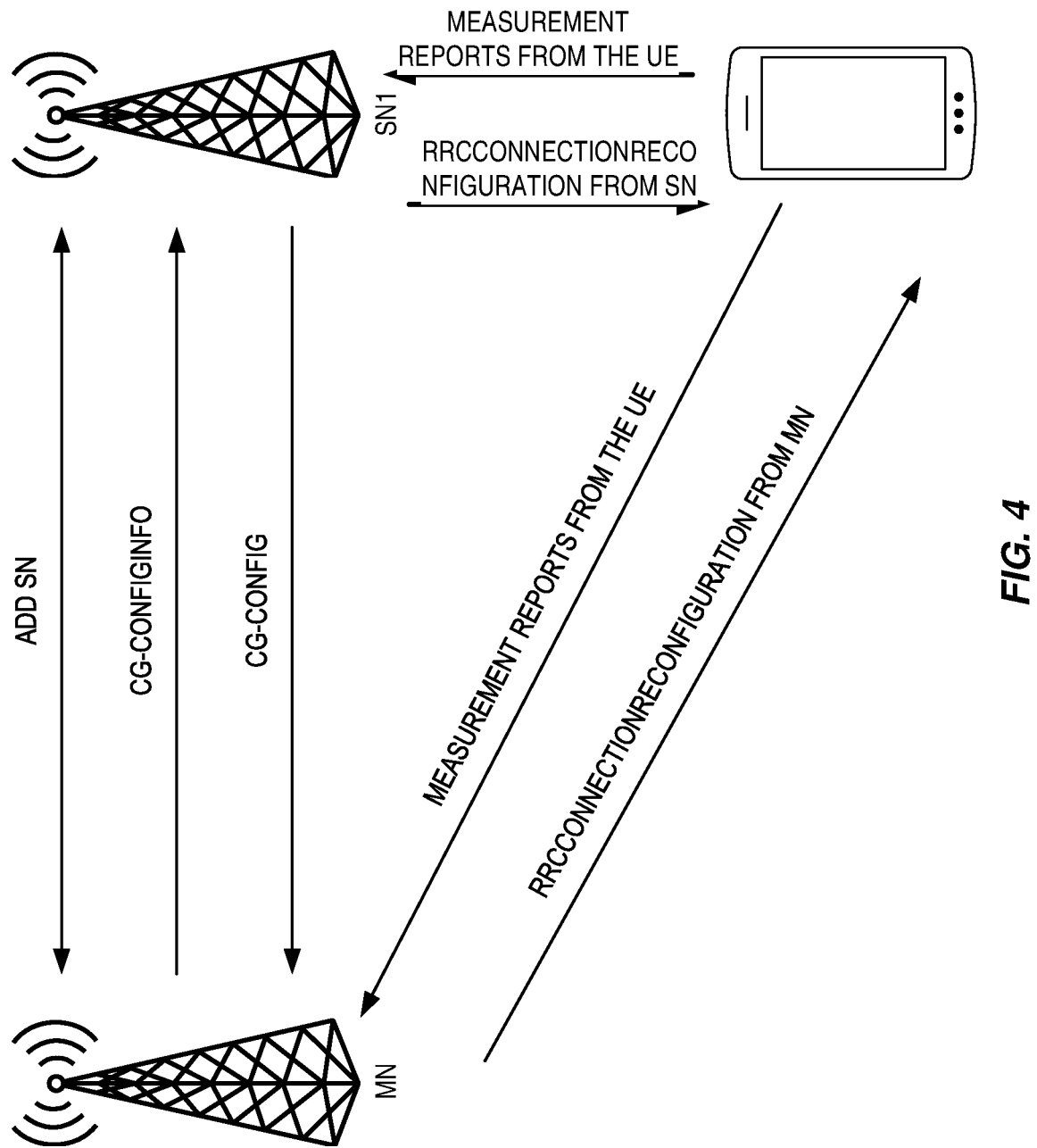
FIG. 4 illustrates an overview of the EN-DC measurement configurations, according to some embodiments of the present disclosure.

An overview of the above EN-DC measurement configurations is given in FIG. 4. Note that an important difference compared to LTE-DC is that since the SN also can configure the UE's measurements, these are also transmitted to the SN via the SRB3 (if configured). The SN then directly acts upon these measurements; the MN never receives these measurements (at least there is no specification that supports this by default). If SRB3 is not configured, the measurement configurations from the SN (and the measurement reports from the UE based on these measurement configurations) are sent to the UE (and the measurement results to the SN) via embedded RRC messages from/to the MN on SRB1, which the MN transparently forwards to the UE (the configurations) and the SN (measurement results).

The idea with Multi-Connectivity (MC) is that the UE can connect to more than two nodes, i.e., more than one SN node. The benefits with MC are similar to DC, but MC allows even more new areas to be utilized, e.g., centralized scheduler, even more robust mobility etc.

For a multi-connectivity solution with only one type of radio, e.g., NR base station, some of the above arguments to have a decentralized solution are not as strong anymore since all NR nodes should be equally capable.

From a migration point of view, it is natural to continue using EN-DC principles also for MC, i.e., using a decentralized solution. Also, there may still be cases when a decentralized measurement solution is beneficial, e.g., when the nodes have different capabilities (e.g., 700 MHz vs. 28 GHz nodes).

In LTE (e.g., Rel-15), it is possible to configure the UE to report early measurements upon the transition from idle to connected state. These measurements are measurements that the UE has performed in idle state, and according to a configuration provided by the source cell with the intention to receive these measurements and quickly setup DC/CA without the need to first provide a measurement configuration (measConfig) in connected state and wait for hundreds of milliseconds until first samples are collected, monitored and then the first reports are triggered.

A first aspect of the existing solution, as standardized in EUTRA 36.331, is described in 5.6.20 Idle Mode Measurements. Therein, the UE is configured upon the transition from RRC_CONNECTED to RRC_IDLE with a dedicated measurement configuration in the RRCConnectionRelease message, highlighted as follows:

| RRCConnectionRelease message |
|---|
| -- ASN1START |
| RRCConnectionRelease ::=           SEQUENCE { |
|    rrc-TransactionIdentifier           RRC-TransactionIdentifier, |
|    criticalExtensions           CHOICE { |
|      c1           CHOICE { |
|        rrcConnectionRelease-r8           RRCConnection Release-r8-IEs, |
|        spare3 NULL, spare2 NULL, spare1 NULL |
|      }, |
|      criticalExtensionsFuture           SEQUENCE { } |
|    } |
| } |
| -- other info has been omitted |
| RRCConnectionRelease-v1530-IEs ::=           SEQUENCE { |
|    drb-ContinueROHC-r15           ENUMERATED {true}           OPTIONAL,           -- Cond UP-EDT |
|    nextHopChainingCount-r15           NextHopChainingCount           OPTIONAL,           -- Cond UP-EDT |
|    measIdleConfig-r15           MeasIdleConfigDedicated-r15           OPTIONAL,           -- Need ON |
|    rrc-InactiveConfig-r15           RRC-InactiveConfig-r15           OPTIONAL,           -- Need OR |
|    cn-Type-r15           ENUMERATED { epc,fivegc}           OPTIONAL,           -- Need OR |
|    nonCriticalExtension           SEQUENCE { }           OPTIONAL |
| } |
| -- ASN1STOP |

| MeasIdleConfig information element |
|---|
| -- ASN1START |
| MeasIdleConfigSIB-r15 ::= SEQUENCE { |
|   measIdleCarrierListEUTRA-r15   EUTRA-CarrierList-r15, |
|   ... |
| } |
| MeasIdleConfigDedicated-r15 ::= SEQUENCE { |
|   measIdleCarrierListEUTRA-r15   EUTRA-CarrierList-r15           OPTIONAL,   -- Need OR |
|    measIdleDuration-r15           ENUMERATED {sec10, sec30, sec60, sec120, sec180, sec240, sec300, spare}, |
|   ... |
| } |
| EUTRA-CarrierList-r15 ::= SEQUENCE (SIZE (1..maxFreqIdle-r15)) OF MeasIdleCarrierEUTRA-r15 |
| MeasIdleCarrierEUTRA-r15::=           SEQUENCE { |
|    carrierFreq-r15           ARFCN-ValueEUTRA-r9, |
|    allowedMeasBandwidth-r15           AllowedMeasBandwidth, |
|    validityArea-r15           CellList-r15           OPTIONAL,   -- Need OR |
|    measCellList-r15           CellList-r15           OPTIONAL,   -- Need OR |
|    reportQuantities           ENUMERATED {rsrp, rsrq, both}, |
|    qualityThreshold-r15           SEQUENCE { |
|      idleRSRP-Threshold-r15           RSRP-Range           OPTIONAL,   -- Need OR |

```
                    MeasIdleConfig information element idleRSRQ-Threshold-r15       RSRQ-Range-r13        OPTIONAL-- Need
OR
    }                                                  OPTIONAL,  -- Need OR
    ...
}
CellList-r15 ::=   SEQUENCE (SIZE (1.. maxCellMeasIdle-r15)) OF PhysCellIdRange
-- ASN1STOP
```

| MeasIdleConfig field descriptions |
| --- |
| allowedMeasBandwidth |
| If absent, the value corresponding to the downlink bandwidth indicated by the dl-Bandwidth included in MasterInformationBlock of serving cell applies. |
| carrierFreq |
| Indicates the E-UTRA carrier frequency to be used for measurements during IDLE mode. |
| measIdleCarrierListEUTRA |
| Indicates the E-UTRA carriers to be measured during IDLE mode. |
| measIdleDuration |
| Indicates the duration for performing measurements during IDLE mode for measurements assigned via RRCConnectionRelease. Value sec10 correspond to 10 seconds, value sec30 to 30 seconds and so on. |
| qualityThreshold |
| Indicates the quality thresholds for reporting the measured cells for IDLE mode measurements. |
| reportQuantities |
| Indicates which measurement quantities UE is requested to report in the IDLE mode measurement report. |
| measCellList |
| Indicates the list of cells which the UE is requested to measure and report for IDLE mode measurements. |
| validityArea |
| Indicates the list of cells within which UE is requested to do IDLE mode measurements. If the UE reselects to a cell outside this list, the measurements are no longer required. |

As shown above, a validity timer is also introduced in that configuration. The timer is started upon the reception of the dedicated measurement configuration and stops upon receiving RRCConnectionSetup, RRCConnectionResume or, if validityArea is configured, upon reselecting to cell that does not belong to validityArea. Upon expiry, these measurements performed in idle may be discarded. The intention with validity area is to limit the area where CA/DC may be setup later when the UE resumes/setups the connection, so the early measurements are somewhat useful for that purpose. Notice also that only measurements above a certain thresholds shall be stored as the cell candidates for DC/CA setup needs to be within a minimum acceptable threshold.

How the UE performs measurements in IDLE mode is up to UE implementation as long as RAN4 requirements for measurement reporting defined in 36.133 are met.

The UE behaviour in more details is shown below as captured in 36.331:

This procedure specifies the measurements done by a UE in RRC_IDLE when it has an IDLE mode measurement configuration and the storage of the available measurements by a UE in both RRC_IDLE and RRC_CONNECTED.

Initiation
While T331 is running, the UE shall:
1> perform the measurements in accordance with the following:
  2> for each entry in measIdleCarrierListEUTRA within VarMeasIdleConfig:
    3> if UE supports carrier aggregation between serving carrier and the carrier frequency and bandwidth indicated by carrierFreq and allowedMeasBandwidth within the corresponding entry;
      4> perform measurements in the carrier frequency and bandwidth indicated by carrierFreq and allowedMeasBandwidth within the corresponding entry;
      NOTE: How the UE performs measurements in IDLE mode is up to UE implementation as long as the requirements in 36.133 are met for measurement reporting. UE is not required to perform idle measurements if SIB2 idle measurement indication is not configured.
      4> if the measCellList is included:
        5> consider PCell and cells identified by each entry within the measCellList to be applicable for idle mode measurement reporting;
      4> else:
        5> consider PCell and up to maxCellMeasIdle strongest identified cells whose Reference Signal Received Power (RSRP)/Reference Signal Received Quality (RSRQ) measurement results are above the value(s) provided in qualityThreshold (if any) to be applicable for idle mode measurement reporting;
      4> store measurement results for cells applicable for idle mode measurement reporting within the VarMeasIdleReport;
    3> else:
      4> do not consider the carrier frequency to be applicable for idle mode measurement reporting;
1> if validityArea is configured in VarMeasIdleConfig and UE reselects to a serving cell whose physical cell identity does not match any entry in validityArea for the corresponding carrier frequency:
  2> stop T331;
T331 Expiry or Stop
The UE shall:
1> if T331 expires or is stopped:
  2> release the contents of VarMeasIdleConfig;
NOTE: It is up to UE implementation whether to continue IDLE mode measurements according to SIB5 configuration after T331 has expired or stopped.

Another aspect of the existing solution occurs when the UE tries to resume. If the previous step is performed, i.e., if the UE is configured to store idle measurements, the network may request the UE after resume/setup (after security is activated) whether the UE has idle measurements available.

Figure 5:
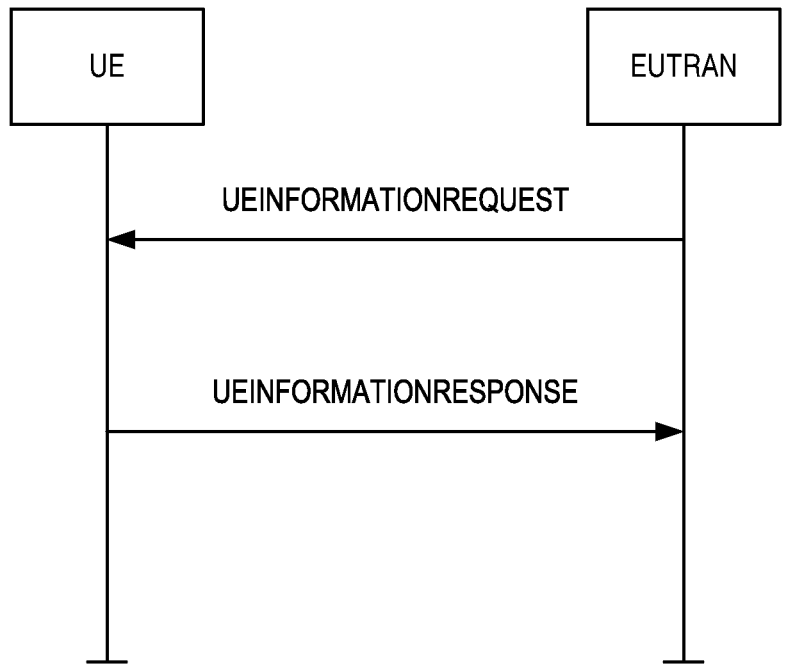
FIG. 5 illustrates a method performed by a target requesting the availability of stored measurements, according to some embodiments of the present disclosure.

In the case this UE is resuming, the target cell (as long as within the validity area) should be aware of that since the UE Access Stratum (AS) context (After context fetching should contain the latest configurations the UE has received upon entering IDLE). The way the target requests the availability of these stored measurements, is by sending to the UE a UEInformationRequest message, after the UE starts security and enters. This is illustrated in FIG. 5.

Reception of the UEInformationRequest Message

Upon receiving the UEInformationRequest message, the UE shall, only after successful security activation:

1> if the idleModeMeasurementReq is included in the UEInformationRequest and UE has stored VarMeasIdleReport:
   2> set the measResultListIdle in the UEInformationResponse message to the value of idleMeasReport in the VarMeasIdleReport;
   2> discard the VarMeasIdleReport upon successful delivery of the UEInformationResponse message confirmed by lower layers;

The network may configure the UE to perform the following types of measurements:
  NR measurements;
  Inter-Radio Access Technology (RAT) measurements of E-UTRA frequencies.

The network may configure the UE to report the following measurement information based on SS/PBCH block(s):
  Measurement results per SS/Physical Broadcasting Channel (PBCH) block;
  Measurement results per cell based on SS/PBCH block(s);
  SS/PBCH block(s) indexes.

The network may configure the UE to report the following measurement information based on Channel State Information Reference Signal (CSI-RS) resources:
  Measurement results per CSI-RS resource;
  Measurement results per cell based on CSI-RS resource(s);
  CSI-RS resource measurement identifiers.

The measurement configuration includes the following parameters:
1. Measurement objects: A list of objects on which the UE shall perform the measurements.

```
                        UEInformationResponse message

-- ASN1START
UEInformationResponse-r9    ::=     SEQUENCE {
    rrc-TransactionIdentifier       RRC-Transaction Identifier,
    criticalExtensions              CHOICE {
        c1                          CHOICE {
            ueInformationResponse-r9            UEInformationResponse-r9-IEs,
            spare3 NULL, spare2 NULL, spare1 NULL
        },
        criticalExtensionsFuture    SEQUENCE { }
    }
}
UEInformationResponse-v1530-IEs ::= SEQUENCE {
    measResultListIdle-r15          MeasResultListIdle-r15      OPTIONAL,
    flightPathInfoReport-r15        FlightPathInfoReport-r15    OPTIONAL,
    nonCriticalExtension            SEQUENCE { }                OPTIONAL
}
```

In summary, measurements performed in idle may only be provided after security is setup. If the UE is released to IDLE (i.e., no UE context stored), security can be up and running only after security mode command procedure (2 radio RTTs after UE enters RRC_CONNECTED i.e., reception of RRC-ConnectionSetup), which may take quite some time until the UE reports these measurements and the network can take educated decisions based on these, such as the setup of CA and/or DC.

If the UE is suspended to IDLE (i.e., UE context stored), there is no need for security mode command procedure and security can be up and running upon the reception of RRCConnectionResume, which contains the next hop chaining counter that enables the UE to start security according to target configuration. Then, after the UE enters RRC_CONNECTED the network may send the UEInformationRequest and get the UEInformationResponse with the idle measurements.

3GPP TS 38.331 includes the following:

The network may configure an RRC_CONNECTED UE to perform measurements and report them in accordance with the measurement configuration. The measurement configuration is provided by means of dedicated signaling i.e., using the RRCReconfiguration.

For intra-frequency and inter-frequency measurements a measurement object indicates the frequency/time location and subcarrier spacing of reference signals to be measured. Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

The measObjectId of the MO which corresponds to each serving cell is indicated by servingCellMO within the serving cell configuration.

For inter-RAT E-UTRA measurements a measurement object is a single E-UTRA carrier frequency. Associated with this E-UTRA carrier frequency, the network can configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

2. Reporting configurations: A list of reporting configurations where there can be one or multiple reporting configurations per measurement object. Each reporting configuration consists of the following:
Reporting criterion: The criterion that triggers the UE to send a measurement report. This can either be periodical or a single event description.
RS type: The RS that the UE uses for beam and cell measurement results (SS/PBCH block or CSI-RS).
Reporting format: The quantities per cell and per beam that the UE includes in the measurement report (e.g., RSRP) and other associated information such as the maximum number of cells and the maximum number beams per cell to report.
3. Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.
4. Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.
5. Measurement gaps: Periods that the UE may use to perform measurements.

A UE in RRC_CONNECTED maintains a measurement object list, a reporting configuration list, and a measurement identities list according to signaling and procedures in this specification. The measurement object list possibly includes NR measurement object(s) and inter-RAT objects. Similarly, the reporting configuration list includes NR and inter-RAT reporting configurations. Any measurement object can be linked to any reporting configuration of the same RAT type. Some reporting configurations may not be linked to a measurement object. Likewise, some measurement objects may not be linked to a reporting configuration.

The measurement procedures distinguish the following types of cells:
1. The NR serving cell(s)—these are the SpCell and one or more SCells.
2. Listed cells—these are cells listed within the measurement object(s).
3. Detected cells—these are cells that are not listed within the measurement object(s) but are detected by the UE on the Synchronization Signal Block (SSB) frequency(ies) and subcarrier spacing(s) indicated by the measurement object(s).

For NR measurement object(s), the UE measures and reports on the serving cell(s), listed cells and/or detected cells. For inter-RAT measurements object(s) of E-UTRA, the UE measures and reports on listed cells and detected cells.

Whenever the procedural specification, other than contained in sub-clause 5.5.2, refers to a field it concerns a field included in the VarMeasConfig unless explicitly stated otherwise i.e., only the measurement configuration procedure covers the direct UE action related to the received measConfig.

In some embodiments, the network applies the procedure as follows:
  to ensure that, whenever the UE has a measConfig, it includes a measObject for the SpCell and for each NR SCell to be measured;
  to configure at most one measurement identity using a reporting configuration with the reportType set to reportCell Group ID (CGI);
  to ensure that for all SSB based measurements there is at most one measurement object with the same ssbFrequency;
  to ensure that all measurement objects configured in this specification and in TS 36.331 with the same ssbFrequency have the same ssbSubcarrierSpacing;
  to ensure that a SS/PBCH Block Measurement Time Configuration (smtc)1 included in any measurement object with the same ssbFrequency has the same value, and that a smtc2 included in any measurement object with the same ssbFrequency has the same value;
  to ensure that, if a measurement object has the same ssbFrequency as a measurement object configured in TS 36.331:
    for that ssbFrequency, the measurement window according to the smtc configured in TS 36.331 includes the measurement window according to the smtc1 configured in TS 38.331, or vice-versa, with an accuracy of the maximum receive timing difference specified in TS 38.133.
    if both measurement objects are used for received signal strength indictor measurements, bits in measurementSlots in both objects corresponding to the same slot are set to the same value. Also, the endSymbol is the same in both objects.

The UE shall:
1> if the received measConfig includes the measObjectToRemoveList:
  2> perform the measurement object removal procedure as specified in 5.5.2.4;
1> if the received measConfig includes the measObjectToAddModList:
  2> perform the measurement object addition/modification procedure as specified in 5.5.2.5;
1> if the received measConfig includes the reportConfigToRemoveList:
  2> perform the reporting configuration removal procedure as specified in 5.5.2.6;
1> if the received measConfig includes the reportConfigToAddModList:
  2> perform the reporting configuration addition/modification procedure as specified in 5.5.2.7;
1> if the received measConfig includes the quantityConfig:
  2> perform the quantity configuration procedure as specified in 5.5.2.8;
1> if the received measConfig includes the measIdToRemoveList:
  2> perform the measurement identity removal procedure as specified in 5.5.2.2;
1> if the received measConfig includes the measIdToAddModList:
  2> perform the measurement identity addition/modification procedure as specified in 5.5.2.3;

1> if the received measConfig includes the measGapConfig:
2> perform the measurement gap configuration procedure as specified in 5.5.2.9;
1> if the received measConfig includes the measGapSharingConfig:
2> perform the measurement gap sharing configuration procedure as specified in 5.5.2.11;
1> if the received measConfig includes the s-MeasureConfig:
2> if s-MeasureConfig is set to ssb-RSRP, set parameter ssb-RSRP of s-MeasureConfig within VarMeasConfig to the lowest value of the RSRP ranges indicated by the received value of s-MeasureConfig;
2> else, set parameter csi-RSRP of s-MeasureConfig within VarMeasConfig to the lowest value of the RSRP ranges indicated by the received value of s-MeasureConfig.

Measurement Identity Removal

The UE shall:
1> for each measId included in the received measIdToRemoveList that is part of the current UE configuration in VarMeasConfig:
2> remove the entry with the matching measId from the measIdList within the VarMeasConfig;
2> remove the measurement reporting entry for this measId from the VarMeasReportList, if included;
2> stop the periodical reporting timer or timer T321, whichever one is running, and reset the associated information (e.g., timeToTrigger) for this measId.

NOTE: The UE does not consider the message as erroneous if the measIdToRemoveList includes any measId value that is not part of the current UE configuration.

The network applies the procedure as follows:
configure a measId only if the corresponding measurement object, the corresponding reporting configuration and the corresponding quantity configuration, are configured.

The UE shall:
1> for each measId included in the received measIdToAddModList:
2> if an entry with the matching measId exists in the measIdList within the VarMeasConfig:
3> replace the entry with the value received for this measId;
2> else:
3> add a new entry for this measId within the VarMeasConfig;
2> remove the measurement reporting entry for this measId from the VarMeasReportList, if included;
2> stop the periodical reporting timer or timer T321, whichever one is running, and reset the associated information (e.g., timeToTrigger) for this measId.
2> if the reportType is set to reportCGI in the reportConfig associated with this measId:
3> if the measObject associated with this measId concerns E-UTRA:
4> start timer T321 with the timer value set to 1 second for this measId;
3> if the measObject associated with this measId concerns NR:
4> if the measObject associated with this measId concerns FR1:
5> start timer T321 with the timer value set to 2 seconds for this measId;
4> if the measObject associated with this measId concerns FR2:
5> start timer T321 with the timer value set to 16 seconds for this measId;

For Measurement object removal, the UE shall:
1> for each measObjectId included in the received measObjectToRemoveList that is part of measObjectList in VarMeasConfig:
2> remove the entry with the matching measObjectId from the measObjectList within the VarMeasConfig;
2> remove all measId associated with this measObjectId from the measIdList within the VarMeasConfig, if any;
2> if a measId is removed from the measIdList:
3> remove the measurement reporting entry for this measId from the VarMeasReportList, if included;
3> stop the periodical reporting timer or timer T321, whichever is running, and reset the associated information (e.g., timeToTrigger) for this measId.

NOTE: The UE does not consider the message as erroneous if the measObjectToRemoveList includes any measObjectId value that is not part of the current UE configuration.

For Measurement object addition/modification, the UE shall:
1> for each measObjectId included in the received measObjectToAddModList:
2> if an entry with the matching measObjectId exists in the measObjectList within the VarMeasConfig, for this entry:
3> reconfigure the entry with the value received for this measObject, except for the fields cellsToAddModList, blackCellsToAddModList, whiteCellsToAddModList, cellsToRemoveList, blackCellsToRemoveList and whiteCellsToRemoveList;
3> if the received measObject includes the cellsToRemoveList:
4> for each physCellId included in the cellsToRemoveList:
5> remove the entry with the matching physCellId from the cellsToAddModList;
3> if the received measObject includes the cellsToAddModList:
4> for each physCellId value included in the cellsToAddModList:
5> if an entry with the matching physCellId exists in the cellsToAddModList:
6> replace the entry with the value received for this physCellId;
5> else:
6> add a new entry for the received physCellId to the cellsToAddModList;
3> if the received measObject includes the blackCellsToRemoveList:
4> for each Physical Cell Identity (pci)-RangeIndex included in the blackCellsToRemoveList:
5> remove the entry with the matching pci-RangeIndex from the blackCellsToAddModList;

NOTE: For each pci-RangeIndex included in the blackCellsToRemoveList that concerns overlapping ranges of cells, a cell is removed from the black list of cells only if all cell indexes containing it are removed.

3> if the received measObject includes the blackCellsToAddModList:
    4> for each pci-RangeIndex included in the blackCellsToAddModList:
        5> if an entry with the matching pci-RangeIndex is included in the blackCellsToAddModList:
            6> replace the entry with the value received for this pci-RangeIndex;
        5> else:
            6> add a new entry for the received pci-RangeIndex to the blackCellsToAddModList;
3> if the received measObject includes the whiteCellsToRemoveList:
    4> for each pci-RangeIndex included in the whiteCellsToRemoveList:
        5> remove the entry with the matching pci-RangeIndex from the whiteCellsToAddModList;
3> if the received measObject includes the whiteCellsToAddModList:
    4> for each pci-RangeIndex included in the whiteCellsToAddModList:
        5> if an entry with the matching pci-RangeIndex is included in the whiteCellsToAddModList:
            6> replace the entry with the value received for this pci-RangeIndex;
        5> else:
            6> add a new entry for the received pci-RangeIndex to the whiteCellsToAddModList;
3> for each measId associated with this measObjectId in the measIdList within the VarMeasConfig, if any:
    4> remove the measurement reporting entry for this measId from the VarMeasReportList, if included;
    4> stop the periodical reporting timer or timer T321, whichever one is running, and reset the associated information (e.g., timeToTrigger) for this measId;
2> else:
    3> add a new entry for the received measObject to the measObjectList within VarMeasConfig.

For Reporting configuration removal, the UE shall:
1> for each reportConfigId included in the received reportConfigToRemoveList that is part of the current UE configuration in VarMeasConfig:
    2> remove the entry with the matching reportConfigId from the reportConfigList within the VarMeasConfig;
    2> remove all measId associated with the reportConfigId from the measIdList within the VarMeasConfig, if any;
    2> if a measId is removed from the measIdList:
        3> remove the measurement reporting entry for this measId from the VarMeasReportList, if included;
        3> stop the periodical reporting timer or timer T321, whichever one is running, and reset the associated information (e.g., timeToTrigger) for this measId.

NOTE: The UE does not consider the message as erroneous if the reportConfigToRemoveList includes any reportConfigId value that is not part of the current UE configuration.

For Reporting configuration addition/modification, the UE shall:
1> for each reportConfigId included in the received reportConfigToAddModList:
    2> if an entry with the matching reportConfigId exists in the reportConfigList within the VarMeasConfig, for this entry:
        3> reconfigure the entry with the value received for this reportConfig;
        3> for each measId associated with this reportConfigId included in the measIdList within the VarMeasConfig, if any:
            4> remove the measurement reporting entry for this measId from the VarMeasReportList, if included;
            4> stop the periodical reporting timer or timer T321, whichever one is running, and reset the associated information (e.g., timeToTrigger) for this measId;
    2> else:
        3> add a new entry for the received reportConfig to the reportConfigList within the VarMeasConfig.

NOTE: UE does not need to retain the reportConfig with the associated cellForWhichToReportCGI and measId after reporting cgi-Info.

For Quantity configuration, the UE shall:
1> for each RAT for which the received quantityConfig includes parameter(s):
    2> set the corresponding parameter(s) in quantityConfig within VarMeasConfig to the value of the received quantityConfig parameter(s);
1> for each measId included in the measIdList within VarMeasConfig:
    2> remove the measurement reporting entry for this measId from the VarMeasReportList, if included;
    2> stop the periodical reporting timer or timer T321, whichever one is running, and reset the associated information (e.g., timeToTrigger) for this measId.

For Measurement gap configuration, the UE shall:
1> if gapFR1 is set to setup:
    2> if an FR1 measurement gap configuration is already setup, release the FR1 measurement gap configuration;
    2> setup the FR1 measurement gap configuration indicated by the measGapConfig in accordance with the received gapOffset, i.e., the first subframe of each gap occurs at a System Frame Number (SFN) and subframe meeting the following condition:
    SFN mod T=FLOOR(gapOffset/10);
    subframe=gapOffset mod 10;
    with T=MGRP/10 as defined in TS 38.133;
    2> if Measurement Gap Timing Advance (mgta) is configured, apply the specified timing advance to the gap occurrences calculated above (i.e., the UE starts the measurement mgta ms before the gap subframe occurrences);
1> else if gapFR1 is set to release:
    2> release the FR1 measurement gap configuration;
1> if gapFR2 is set to setup:
    2> if an FR2 measurement gap configuration is already setup, release the FR2 measurement gap configuration;

2> setup the FR2 measurement gap configuration indicated by the measGapConfig in accordance with the received gapOffset, i.e., the first subframe of each gap occurs at an SFN and subframe meeting the following condition:
SFN mod T=FLOOR(gapOffset/10);
subframe=gapOffset mod 10;
with T=MGRP/10 as defined in TS 38.133;
2> if mgta is configured, apply the specified timing advance to the gap occurrences calculated above (i.e., the UE starts the measurement mgta ms before the gap subframe occurrences);
1> else if gapFR2 is set to release:
2> release the FR2 measurement gap configuration;
1> if gapUE is set to setup:
2> if a per UE measurement gap configuration is already setup, release the per UE measurement gap configuration;
2> setup the per UE measurement gap configuration indicated by the measGapConfig in accordance with the received gapOffset, i.e., the first subframe of each gap occurs at an SFN and subframe meeting the following condition:
SFN mod T=FLOOR(gapOffset/10);
subframe=gapOffset mod 10;
with T=MGRP/10 as defined in TS 38.133;
2> if mgta is configured, apply the specified timing advance to the gap occurrences calculated above (i.e., the UE starts the measurement mgta ms before the gap subframe occurrences);
1> else if gapUE is set to release:
2> release the per UE measurement gap configuration.
NOTE 1: For gapFR2 configuration, the SFN and subframe of a serving cell on FR2 frequency is used in the gap calculation
NOTE 2: For gapFR1 or gapUE configuration, the SFN and subframe of the PCell is used in the gap calculation.

Reference signal measurement timing configuration. The UE shall setup the first SS/PBCH block measurement timing configuration (SMTC) in accordance with the received periodicityAndOffset parameter (providing Periodicity and Offset value for the following condition) in the smtc1 configuration. The first subframe of each SMTC occasion occurs at an SFN and subframe of the NR SpCell meeting the following condition:

SFN mod $T$=(FLOOR(Offset/10));

if the Periodicity is larger than sf5:

subframe=Offset mod 10;

else:

subframe=Offset or (Offset+5);

with $T$=CEIL(Periodicity/10).

If smtc2 is present, for cells indicated in the pci-List parameter in smtc2 in the same MeasObjectNR, the UE shall setup an additional SS/PBCH block Measurement Timing Configuration (SMTC) in accordance with the received periodicity parameter in the smtc2 configuration and use the Offset (derived from parameter periodicityAndOffset) and duration parameter from the smtc1 configuration. The first subframe of each SMTC occasion occurs at an SFN and subframe of the NR SpCell meeting the above condition:

On the indicated ssbFrequency, the UE shall not consider SS/PBCH block transmission in subframes outside the SMTC occasion for RRM measurements based on SS/PBCH blocks and for RRM measurements based on CSI-RS.

For Measurement gap sharing configuration, the UE shall:
1> if gapSharingFR1 is set to setup:
2> if an FR1 measurement gap sharing configuration is already setup, release the measurement gap sharing configuration;
2> setup the FR1 measurement gap sharing configuration indicated by the measGapSharingConfig in accordance with the received measGapSharingScheme as defined in TS 38.133;
1> else if gapSharingFR1 is set to release:
2> release the FR1 measurement gap sharing configuration;
1> if gapSharingFR2 is set to setup:
2> if an FR2 measurement gap sharing configuration is already setup, release the measurement gap sharing configuration;
2> setup the FR2 measurement gap sharing configuration indicated by the measGapSharingConfig in accordance with the received measGapSharingScheme as defined in TS 38.133;
1> else if gapSharingFR2 is set to release:
2> release the FR2 measurement gap sharing configuration.
1> if gapSharingUE is set to setup:
2> if a per UE measurement gap sharing configuration is already setup, release the per UE measurement gap sharing configuration;
2> setup the per UE measurement gap sharing configuration indicated by the measGapSharingConfig in accordance with the received measGapSharingScheme as defined in TS 38.133;
1> else if gapSharingUE is set to release:
2> release the per UE measurement gap sharing configuration.

Paging allows the network to reach UEs in RRC_IDLE and in RRC_INACTIVE state, and to notify UEs in RRC_IDLE, RRC_INACTIVE and RRC_CONNECTED state of system information change (see subclause 7.3.3) and Earthquake and Tsunami Warning System (ETWS)/Commercial Mobile Alert System (CMAS) indications (see subclause 16.4).

While in RRC_IDLE, the UE monitors the paging channels for CN-initiated paging; in RRC_INACTIVE the UE also monitors paging channels for RAN-initiated paging. A UE need not monitor paging channels continuously though; Paging DRX is defined where the UE in RRC_IDLE or RRC_INACTIVE is only required to monitor paging channels during one Paging Occasions (PO) per DRX cycle (see TS 38.304). The Paging DRX cycles are configured by the network:

1. For CN-initiated paging, a default cycle is broadcast in system information;
2. For CN-initiated paging, a UE specific cycle can be configured via Non-Access Stratum (NAS) signaling;
3. For RAN-initiated paging, a UE-specific cycle is configured via RRC signaling;

UE uses the shortest of the DRX cycles applicable i.e., a UE in RRC_IDLE uses the shorter of the first two cycles above, while a UE in RRC_INACTIVE uses the shortest of the three.

The POs of a UE for CN-initiated and RAN-initiated paging are based on the same UE ID, resulting in overlapping POs for both. The number of different POs in a DRX cycle is configurable via system information and a network may distribute UEs to those POs based on their IDs.

When in RRC_CONNECTED, the UE monitors the paging channels in any PO signaled in system information for SI change indication and PWS notification. In case of Bandwidth Adaptation (BA), a UE in RRC_CONNECTED only monitors paging channels on the active Bandwidth Part (BWP) with common search space configured.

Paging optimization for UEs in CM_IDLE: at UE context release, the NG-RAN node may provide the AMF with a list of recommended cells and NG-RAN nodes as assistance info for subsequent paging. The AMF may also provide Paging Attempt Information consisting of a Paging Attempt Count and the Intended Number of Paging Attempts and may include the Next Paging Area Scope. If Paging Attempt Information is included in the Paging message, each paged NG-RAN node receives the same information during a paging attempt. The Paging Attempt Count shall be increased by one at each new paging attempt. The Next Paging Area Scope, when present, indicates whether the AMF plans to modify the paging area currently selected at next paging attempt. If the UE has changed its state to CM CONNECTED the Paging Attempt Count is reset.

Paging optimization for UEs in RRC_INACTIVE: at RAN Paging, the serving NG-RAN node provides RAN Paging area information. The serving NG-RAN node may also provide RAN Paging attempt information. Each paged NG-RAN node receives the same RAN Paging attempt information during a paging attempt with the following content: Paging Attempt Count, the intended number of paging attempts and the Next Paging Area Scope. The Paging Attempt Count shall be increased by one at each new paging attempt. The Next Paging Area Scope, when present, indicates whether the serving NG_RAN node plans to modify the RAN Paging Area currently selected at next paging attempt. If the UE leaves RRC_INACTIVE state the Paging Attempt Count is reset.

Figure 6:
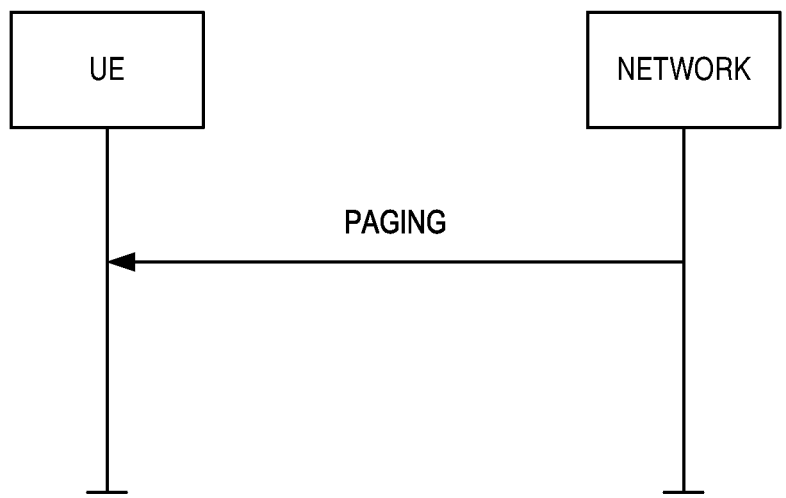
FIG. 6 illustrates transmit paging information to a UE in RRC_IDLE or RRC_INACTIVE, according to some embodiments of the present disclosure.

The purpose of this procedure is to transmit paging information to a UE in RRC_IDLE or RRC_INACTIVE. This is illustrated in FIG. 6.

The network initiates the paging procedure by transmitting the Paging message at the UE's paging occasion as specified in TS 38.304. The network may address multiple UEs within a Paging message by including one PagingRecord for each UE.

For Reception of the Paging message by the UE, upon receiving the Paging message, the UE shall:
1> if in RRC_IDLE, for each of the PagingRecord, if any, included in the Paging message:
  2> if the UE-Identity included in the PagingRecord matches the UE identity allocated by upper layers:
    3> forward the UE-Identity and accessType (if present) to the upper layers;
1> if in RRC_INACTIVE, for each of the PagingRecord, if any, included in the Paging message:
  2> if the UE-Identity included in the PagingRecord matches the UE's stored full-RNTI:
    3> if the UE is configured by upper layers with access identity 1:
      4> initiate the RRC connection resumption procedure according to 5.3.13 with resumeCause set to MPS-PriorityAccess;
    3> else if the UE is configured by upper layers with access identity 2:
      4> initiate the RRC connection resumption procedure according to 5.3.13 with resumeCause set to MCS-PriorityAccess;
    3> else if the UE is configured by upper layers with one or more access identities equal to 11-15:
      4> initiate the RRC connection resumption procedure according to 5.3.13 with resumeCause set to highPriorityAccess;
    3> else:
      4> initiate the RRC connection resumption procedure according to 5.3.13 with resumeCause set to mt-Access;
  2> else if the UE-Identity included in the Paging Record matches the UE identity allocated by upper layers:
    3> forward the UE-Identity to upper layers and accessType (if present) to the upper layers;
    3> perform the actions upon going to RRC_IDLE as specified in 5.3.11 with release cause 'other'.

The Paging message is used for the notification of one or more UEs.

Signaling radio bearer: N/A
Radio Link Control (RLC)-Service Access Point (SAP): Transmission Mode (TM)
Logical channel: Paging Control Channel (PCCH)
Direction: Network to UE

```
                             Paging message

-- ASN1START
-- TAG-PAGING-START
Paging ::=                  SEQUENCE {
    pagingRecordList            PagingRecordList               OPTIONAL, -- Need N
    lateNonCriticalExtension    OCTET STRING                   OPTIONAL,
    nonCriticalExtension        SEQUENCE{ }                    OPTIONAL
}
PagingRecordList ::=        SEQUENCE (SIZE(1..maxNrofPageRec)) OF PagingRecord
PagingRecord :: =           SEQUENCE {
    ue-Identity                 PagingUE-Identity,
    accessType                  ENUMERATED {non3GPP}   OPTIONAL,   -- Need N
    ...
}
PagingUE-Identity ::=       CHOICE {
    ng-5G-S-TMSI                NG-5G-S-TMSI,
    fullI-RNTI                  I-RNTI-Value,
    ...
}
-- TAG-PAGING-STOP
-- ASN1STOP
```

| PagingRecord field descriptions accessType |
| --- |
| It indicates whether Paging is originated due to the PDU sessions from the non-3GPP access. |

SIB validity, acquisition and request for on demand system information as described in 3GP TS 38.331.

SIB validity and need to (re)-acquire SIB. The UE shall apply the SI acquisition procedure as defined in clause 5.2.2.3 upon cell selection (e.g., upon power on), cell-reselection, return from out of coverage, after reconfiguration with sync completion, after entering the network from another RAT, upon receiving an indication that the system information has changed, upon receiving a Public Warning System (PWS) notification; and whenever the UE does not have a valid version of a stored SIB.

When the UE acquires a Master Information Block (MIB) or a System Information Block (SIB1) or a System Information (SI) message in a serving cell as described in clause 5.2.2.3, and if the UE stores the acquired SIB then the UE shall store the associated areaScope, if present, and the first Public Land Mobile Network (PLMN)-Identity in the PLMN-IdentityInfoList, CellIdentity, systemInformation-AreaID, if present, and the valueTag, if present as indicated in the si-SchedulingInfo for the SIB. The UE may use a valid stored version of the SI except MIB and SIB1 e.g., after cell re-selection, upon return from out of coverage or after the reception of SI change indication.

NOTE: The storage and management of the stored SIBs in addition to the SIBs valid for the current serving cell is left to UE implementation.

The UE shall:
1> delete any stored version of a SIB after 3 hours from the moment it was successfully confirmed as valid;
1> for each stored version of a SIB:
  2> if the areaScope is associated and its value for the stored version of the SIB is the same as the value received in the si-SchedulingInfo for that SIB from the serving cell:
    3> if the first PLMN-Identity included in the PLMN-IdentityInfoList, the systemInformationAreaID and the valueTag that are included in the si-SchedulingInfo for the SIB received from the serving cell are identical to the PLMN-Identity, the systemInformationAreaID and the valueTag associated with the stored version of that SIB;
    4> consider the stored SIB as valid for the cell;
  2> if the areaScope is not present for the stored version of the SIB and the areaScope value is not included in the si-SchedulingInfo for that SIB from the serving cell:
    3> if the first PLMN-Identity in the PLMN-IdentityInfoList, CellIdentity and valueTag that are included in the si-SchedulingInfo for the SIB received from the serving cell are identical to the first PLMN-Identity, CellIdentity and the valueTag associated with the stored version of that SIB;
    4> consider the stored SIB as valid for the cell;

SI change indication and PWS notification. A modification period is used, i.e., updated SI (other than for ETWS and CMAS) is broadcasted in the modification period following the one where SI change indication is transmitted. The modification period boundaries are defined by SFN values for which SFN mod m=0, where m is the number of radio frames comprising the modification period. The modification period is configured by system information. The UE receives indications about SI modifications and/or PWS notifications using Short Message transmitted with Paging Radio Network Temporary Identifier (P-RNTI) over Downlink Channel Information (DCI) (see clause 6.5). Repetitions of SI change indication may occur within preceding modification period.

UEs in RRC_IDLE or in RRC_INACTIVE shall monitor for SI change indication in its own paging occasion every DRX cycle. UEs in RRC_CONNECTED shall monitor for SI change indication in any paging occasion at least once per modification period if the UE is provided with common search space on the active BWP to monitor paging, as specified in TS 38.213, clause 13.

ETWS or CMAS capable UEs in RRC_IDLE or in RRC_INACTIVE shall monitor for indications about PWS notification in its own paging occasion every DRX cycle. ETWS or CMAS capable UEs in RRC_CONNECTED shall monitor for indication about PWS notification in any paging occasion at least once per modification period if the UE is provided with common search space on the active BWP to monitor paging.

If the UE receives a Short Message, the UE shall:
1> if the UE is ETWS capable or CMAS capable, and the etwsAndCmasIndication bit of Short Message is set:
  2> immediately re-acquire the SIB1;
  2> if the UE is ETWS capable and si-SchedulingInfo includes scheduling information for SIB6:
    3> acquire SIB6, as specified in sub-clause 5.2.2.3.2, immediately;
  2> if the UE is ETWS capable and si-SchedulingInfo includes scheduling information for SIB7:
    3> acquire SIB7, as specified in sub-clause 5.2.2.3.2, immediately;
  2> if the UE is CMAS capable and si-SchedulingInfo includes scheduling information for SIB8:
    3> acquire SIB8, as specified in sub-clause 5.2.2.3.2, immediately;
1> if the systemInfoModification bit of Short Message is set:
  2> apply the SI acquisition procedure as defined in sub-clause 5.2.2.3 from the start of the next modification period.

Acquisition of MIB and SIB1. The UE shall:
1> apply the specified Broadcast Control Channel (BCCH) configuration defined in 9.1.1.1;
1> if UE is in RRC_IDLE or in RRC_INACTIVE:
  2> acquire the MIB, which is scheduled as specified in TS 38.213;
  2> if the UE is unable to acquire the MIB;
    3> perform the actions as specified in clause 5.2.2.5;
  2> else:
    3> perform the actions specified in clause 5.2.2.4.1.
1> if the UE is in RRC_CONNECTED with an active BWP with common search space configured by searchSpaceSIB1 and pagingSearchSpace and has received an indication about change of system information; or
1> if UE is in RRC_IDLE or in RRC_INACTIVE:
  2> if ssb-SubcarrierOffset indicates SIB1 is transmitted in the cell (TS 38.213) and if SIB1 acquisition is required for the UE:
    3> acquire the SIB1, which is scheduled as specified in TS 38.213;
    3> if the UE is unable to acquire the SIB1:
      4> perform the actions as specified in clause 5.2.2.5;
    3> else:
      4> upon acquiring SIB1, perform the actions specified in clause 5.2.2.4.2.
  2> else if SIB1 acquisition is required for the UE and ssb-SubcarrierOffset indicates that SIB1 is not scheduled in the cell:
    3> perform the actions as specified in clause 5.2.2.5.
NOTE: The UE in RRC_CONNECTED is only required to acquire broadcasted SIB1 if the UE can acquire it without disrupting unicast data reception, i.e., the broadcast and unicast beams are quasi co-located.

For SI message acquisition PDCCH monitoring occasion(s) are determined according to searchSpaceOtherSystemInformation. If searchSpaceOtherSystemInformation is set to zero, PDCCH monitoring occasions for SI message reception in SI-window are same as PDCCH monitoring occasions for SIB1 where the mapping between PDCCH monitoring occasions and SSBs is specified in TS 38.213. If searchSpaceOtherSystemInformation is not set to zero, PDCCH monitoring occasions for SI message are determined based on search space indicated by searchSpaceOtherSystemInformation. PDCCH monitoring occasions for SI message which are not overlapping with UL symbols (determined according to Time Division Duplexing (TDD)-Uplink (UL)-Downlink (DL)-ConfigurationCommon) are sequentially numbered from one in the SI window. The $[x*N+K]^{th}$ PDCCH monitoring occasion (s) for SI message in SI-window corresponds to the $K^{th}$ transmitted SSB, where x=0, 1, . . . X−1, K=1, 2, . . . N, N is the number of actual transmitted SSBs determined according to ssb-PositionsInBurst in SIB1 and X is equal to 'CEIL(number of PDCCH monitoring occasions in SI-window/N).

When acquiring an SI message, the UE shall:
1> determine the start of the SI-window for the concerned SI message as follows:
  2> for the concerned SI message, determine the number n which corresponds to the order of entry in the list of SI messages configured by schedulingInfoList in si-SchedulingInfo in SIB1;
  2> determine the integer value x=(n−1)*w, where w is the si-WindowLength;
  2> the SI-window starts at the slot #a, where a=x mod N, in the radio frame for which SFN mod T=FLOOR (x/N), where T is the si-Periodicity of the concerned SI message and N is the number of slots in a radio frame as specified in TS 38.213;
1> receive the PDCCH containing the scheduling RNTI, i.e., SI-RNTI in the PDCCH monitoring occasion(s) for SI message acquisition, from the start of the SI-window and continue until the end of the SI-window whose absolute length in time is given by si-WindowLength, or until the SI message was received;

1> if the SI message was not received by the end of the SI-window, repeat reception at the next SI-window occasion for the concerned SI message in the current modification period;
NOTE 1: The UE is only required to acquire broadcasted SI message if the UE can acquire it without disrupting unicast data reception, i.e., the broadcast and unicast beams are quasi co-located.
NOTE 2: The UE is not required to monitor PDCCH monitoring occasion(s) corresponding to each transmitted SSB in SI-window.
NOTE 3: If the concerned SI message was not received in the current modification period, handling of SI message acquisition is left to UE implementation.
1> perform the actions for the acquired SI message as specified in sub-clause 5.2.2.4.

Request for on demand system information. The UE shall:
1> if SIB1 includes si-SchedulingInfo containing si-RequestConfig or si-RequestConfigSUL:
  2> trigger the lower layer to initiate the Random Access procedure in accordance with using the Physical Random Access Channel (PRACH) preamble(s) and PRACH resource(s) in si-RequestConfig or si-RequestConfigSUL corresponding to the SI message(s) that the UE requires to operate within the cell, and for which si-BroadcastStatus is set to not Broadcasting;
  2> if acknowledgement for SI request is received from lower layers:
    3> acquire the requested SI message(s) as defined in sub-clause 5.2.2.3.2, immediately;
1> else
  2> apply the timeAlignmentTimerCommon included in SIB1;
  2> apply the CCCH configuration as specified in 9.1.1.2;
  2> initiate transmission of the RRCSystemInfoRequest message in accordance with 5.2.2.3.4;
  2> if acknowledgement for RRCSystemInfoRequest message is received from lower layers:
    3> acquire the requested SI message(s) as defined in sub-clause 5.2.2.3.2, immediately;
1> if cell reselection occurs while waiting for the acknowledgment for SI request from lower layers:
  2> reset Medium Access Control (MAC);
  2> if SI request is based on RRCSystemInfoRequest message:
    3> release RLC entity for SRB0.
NOTE: After Random Access Channel (RACH) failure for SI request it is UE implementation when to retry the SI request.

There currently exist certain challenge(s). With the current NR specification, a UE entering in RRC_CONNECTED mode may not take advantage of the possible CA/DC/MC opportunity. In fact, in current specifications there is no support for early measurements by the UE and thus the network is not able to do a fast setup (or resume) of CA or DC in NR. By early measurement, it is meant that measurement results that can be obtained from the UE without the need to send or restore measurement configurations after the UE has gone to CONNECTED mode. This can preferably be even before the UE has received message 4, e.g., RRCResume, so that the network can configure CA/DC immediately in that command.

Further, even if the measurements performed during the UE in RRC_IDLE or RRC_INACTIVE are sent to the network as soon as the UE gets connected, they may not be accurate enough for the network to decide performing some RRC procedures like e.g., handover or SN change/Modification.

In rel-15 NR, the network may decide to setup CA or DC only after the UE enters in RRC_CONNECTED (e.g., possibly after configuring the UE with a measConfig that contains an A4 event for candidate carriers for SCell addition and receiving a measurement report triggered via this configuration). Of course, this means that the functionalities of CA and DC (i.e., low latencies and high data rate) are not fully exploited in case the UE does not have a huge amount of data in its queue, because by the time a decision to setup CA or DC is made, the data buffer could already be empty and UE might soon be sent back to INACTIVE state. In the worst case, the data may have been buffered too long, beyond the latency requirements of the UE bearer by the time CA/DC is setup. In order to avoid these, it would be beneficial if the UE could provide accurate measurements as early as possible to the network when it goes (or even before it goes) to RRC_CONNECTED. Also, the accuracy of the measurements should be high enough to help the network decides the proper RRC configuration for the UE.

In suspend/resume procedure for NR, the UE in RRC_CONNECTED has a stored measurement configuration (modeled in the specification in the UE variable VarMeasconfig, which is like the IE MeasConfig) and, upon reception of an RRCRelease with suspend configuration, the measurement configuration is stored and connected mode measurements are suspended. Then, when the UE needs to resume (e.g., due to paging, NAS request or RNA update) the UE sends an RRC Resume Request like message and receives an RRCResume message. Only at that point in time the UE enters RRC_CONNECTED, restore the previous configuration and apply the measConfig of MeasConfig IE (possibly as a delta signaling to the stored configuration). That is the point in time during the procedure that network may either activate existing events (e.g., A4) configured to assist the setup of CA/DC or add new events (e.g., A4) configuration. When embodiments disclosed herein add new events or activate existing events here it also includes measurement identifiers and/or measurement objects.

For that reason, with the existing solution in NR, it may take hundreds of milliseconds until the first measurement reports are received at the network after the UE entered RRC_CONNECTED (since measurements are resumed upon the reception of RRC Resume like message and/or the new measurements configured in RRC Resume can only be started after that).

To speed up the availability of measurements during the transitions from idle to connected, in LTE Rel-15 an idle mode measurement solution has been standardized, as described in the background. However, that may not speed up the availability of measurements that much, since it still requires another message exchange via UE information request/response, as shown in the figure below. In addition to latency to acquire the measurements, these idle measurements are not as accurate as connected mode measurements, due to the more relaxed requirements for measurement accuracy when the UE is in IDLE state (and in NR, also in INACTIVE state).

Figure 7:
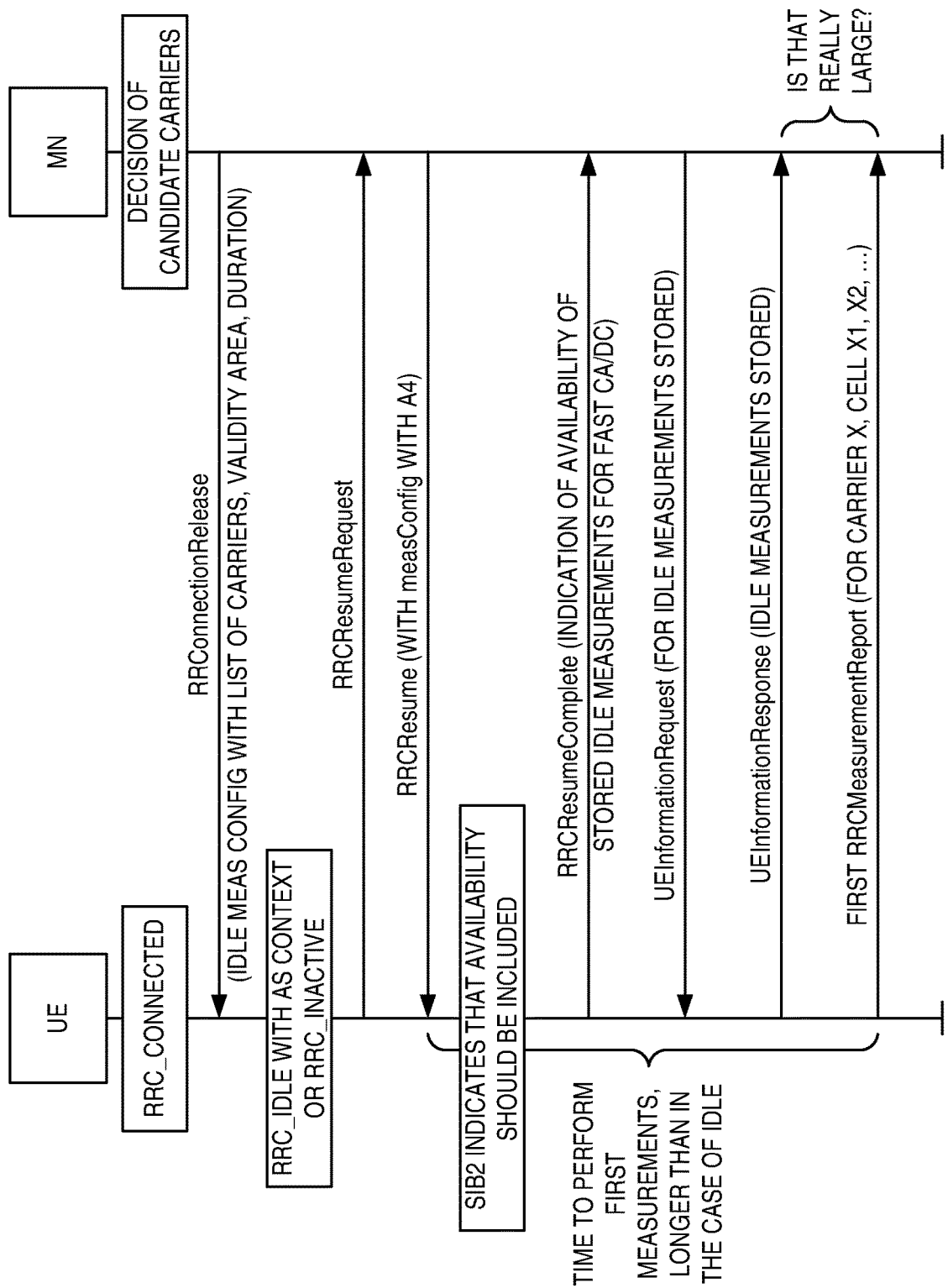
FIG. 7 illustrates an existing mechanism in LTE Rel-15 to indicate support for the request/reception of early idle measurements performed by the UE, according to some embodiments of the present disclosure.

As is shown in FIG. 7, in the existing mechanism in LTE Rel-15 the network has to indicate that it supports the request/reception of early idle measurements performed by the UE is an indication in SIB2 (flag indicating the support) so the UE then includes the availability of measurements in RRCConnectionSetupComplete or RRCConnectionResumeComplete. However, that is an indication that the cell/eNodeB supports the feature, but not that the cell/eNodeB wants a specific UE to report the available idle measurements. For that purpose, the LTE Rel-15 solution introduces a flag in the UEInformationRequest message. The UEInformationRequest is sent on SRB1 and sent only after the UE has indicated that it has measurements available.

Another aspect to be highlighted that represents a limitation in the Rel-15 solution for LTE, if applied in NR, is that these early idle measurements are configured by source when the UE enters RRC_IDLE. That takes into account not only the UE capabilities, but also the source node's possibilities to setup carrier aggregation and/or forms of dual connectivity. A validity area is also associated to that which indicates that outside that area, these measurements might not be so interesting any more. Hence, even if these type of solutions as the one for LTE Rel-15 is defined, it is still relevant to enhance the solution for more general cases, where the UE can move and as fast as possible provide measurements to the network, so that CA and/or DC may be setup as fast as possible by the target network node with assistance information via measurements, if needed.

Yet another shortcoming of existing solutions in LTE is that only already available measurement results carried out by the UE are fetched by the Network (NW). As described above in existing solutions, a potential "early measurement" configuration provided to a UE upon connection release (aforementioned measIdleConfig-r15) is accompanied by a validity timer (measIdleDuration-r15) of range 10 . . . 300 seconds. It is quite difficult for a NW to tune this timer as it comes with the trade-off; high value leads to wasted UE battery time, whereas short values lead to unavailable measurement results from the UE upon successive connections. Also, the maximum value for this timer is only 5 minutes, and quite probable for the UE to have much higher duration between the connection setups. Any other measurements carried out by the UE pass this timer is up to UE implementation and dependent on serving cell quality and priority. As can be found in 3GPP TS 36.304 (LTE) and similarly in 38.304 (Rel-15) there are various thresholds defined in the specifications (e.g., SIntraSearchP, SIntraSearchQ, SnonIntraSearchP, SnonIntraSearchQ) which control the measurement activity of a UE. A UE that is experiencing good coverage above these thresholds in a cell and on a relatively high priority carrier will not constantly carry out measurements on other carriers. Hence, as also in most cases the UEs are in relatively good coverage, the NW-desired measurement results relevant for the "early measurement" feature are not available in the UE upon connection establishment.

Furthermore, depending on when the UE measured the carriers in RRC Idle state, the measurements might be stale.

Lastly, even if the UE would have measurements available in RRC Idle state, the carriers measured might not necessarily be optimal from UE power saving aspects. E.g., it might be so that the UE happens to have measurement results on carriers not adjacent to each other and the NW based on retrieved results sets up CA on those carriers; whereas other available carriers (suitable from UE power saving perspective) would have been equally fine to set up for CA from NW's perspective.

Last, but not least, it is important to note that idle measurements are performed with lower accuracy requirements compared to connected mode. Hence, even if it is important to get measurements as early as possible, for the sake of the use cases described here, low accuracy measurements may lead to non-optimal decisions, e.g., network adds an SCell that is not with good quality, but that has been reported by the UE as a good cell, according to early idle measurements.

Certain aspects of the present disclosure and their embodiments may provide solutions to the aforementioned or other challenges. Embodiments disclosed herein include a method executed by a wireless terminal/UE for measurement reporting configuration while the UE is in dormant state (e.g., RRC_IDLE/RRC_INACTIVE) the method comprising:

Monitoring the potential reception of a message in the downlink (e.g., a paging message or any other message multiplexed with the paging message) in a cell that the UE is camping on;

Monitoring network broadcast message (e.g., SIB4);

Detecting, upon the reception of that downlink message, or from the broadcast message
  an indication to resume measurements according to stored configuration in the UE AS context; or
  the presence of a measurement configuration that indicates that the UE shall perform new measurements according to the configuration received. That measurement configuration provided may comprise lists of measurement objects, report configuration, measurement identifiers, associations between these, etc.; or, if the received indication was to restore the measurement configuration, the UE restores the stored measurement configuration;

If a measurement configuration was included, the UE restores the stored measurement configuration and applies the received measurement configuration on top of it (either as a delta or full configuration, according to the need code structure in MeasConfig IE).

Start performing the measurements according to the restored or the modified/new measurement configurations and report the measurement results when ready (and after security is activated)

In one aspect of the embodiments disclosed herein, an indicator in the paging message from the NW triggering start of measurements in the UE is combined with other configuration (either broadcast in system information or earlier provided through dedicated messages) i.e., the combination of the two constitutes a measurement configuration. Some further aspects relevant to this aspect are outlined below:

a UE in dormant (described above) state has read SIB4 (or another SIB or a newly introduced SIB), in which a number of carriers are configured; Or UE was configured with a set of carriers relevant for this purpose in a dedicated message (e.g., the last dedicated RRC Release message). The indicator codepoints in the paging message could then serve as a mask (e.g., size 8 bits, equal to maximum amount of frequencies that can be provided in dedicated/broadcast signals) saying which out of those carriers broadcast/configured are relevant. E.g., a mask 10100000 would mean that the NW wants to have measurements on carrier number 1 and 3 in the list provided in system information (e.g., SIB4). Mask 0xFF could mean measurements are desired on everything configured.

In another aspect, like above, the UE has acquired the configuration from system information (e.g., SIB4); Or UE was configured with a set of carriers relevant for this purpose in last RRC Release. In addition, in the configuration given, each carrier has an indicator, e.g., called RelevantForCA/DC with values (TRUE/FALSE). The indicator in the paging message, there is a single TRUE/FALSE indicator, saying that the NW wants to have measurements on the carriers for which "RelevantForCA/DC"=TRUE.

In yet another aspect, the UE has previously received various configurations (broadcast/dedicated), each with an identity, similar to MeasId. The paging indicator would carry the identity of the configuration relevant for the purpose.

In all aspects above, additional indicator/configuration can be provided to the UEs informing that the NW is interested in using X number of carriers for CA/DC. The UE would among all carriers provided in the relevant measurement configurations outlined above (for example, having Y carriers configured where potentially Y>X) choose to measure on X out of Y carriers that are beneficial for the UE e.g., in terms of power consumption. For example, the UE may choose to carry out measurement on adjacent carriers utilizing the same HW blocks in the UE.

In the aspects above related to the measurement configuration, the configuration could be not just for one or several carriers but also for one or several cells per each carrier. As an alternative the measurement configuration for a carrier could include a list of cells that are not part of the measurement configuration.

Furthermore, in several of the aspects above, the indicators outlined in the paging message above could either be user-specific or common to all/several UEs receiving the paging message. For example, the indicators could be accompanied with the PagingUE-Identity (38.331) transmitted within the PDSCH and only relevant for that specific UE. Alternately, the indictor could be put on a higher level relevant for multiple/all UEs. In one aspect the indicator is put in the PDCCH itself (inside Short message, see 38331) rather than PDSCH and would be relevant for all UEs decoding that PDCCH message, or for e.g., all UEs that have received a measurement configuration earlier or for all UEs that support Carrier Aggregation (CA) and/or Dual Connectivity (DC).

Embodiments disclosed herein propose the following solution (from the network perspective):

The network may include an indication to start measurement according to stored configuration in the UE context or provide a measurement configuration within the paging message (or in a broadcast message) and the UE uses such configuration and starts performing measurements even before the reception of the resume message that will officially put the UE in CONNECTED mode.

While the embodiments disclosed herein mainly propose several embodiments to indicate starting measurements during idle/inactive state for enabling fast CA/DC setup, it should also be noted that the network could also use the same embodiments to indicate stopping measurements which are dedicated to fast CA/DC setup.

A method in the network for providing the UE with:
  an indication to start measurements (using stored measurement configuration) even before sending the RRC message to resume a dormant connection
  a completely new measurement configuration or an update of the old configuration even before sending the RRC message to resume a dormant connection
  providing the indication or/and measurement configuration using the paging message or/and via broadcast message A method in the UE for:
- receiving an indication to start measurements (using stored measurement configuration) even before the reception of the RRC message to resume a dormant connection
- receiving a completely new measurement configuration or an update of the old configuration even before the reception of the RRC message to resume a dormant connection
- receiving the indication or/and measurement configuration in the paging message or/and via broadcast message
- starting the measurements upon the reception of the paging message without waiting for the completion of the resume procedure.

Figure 8:
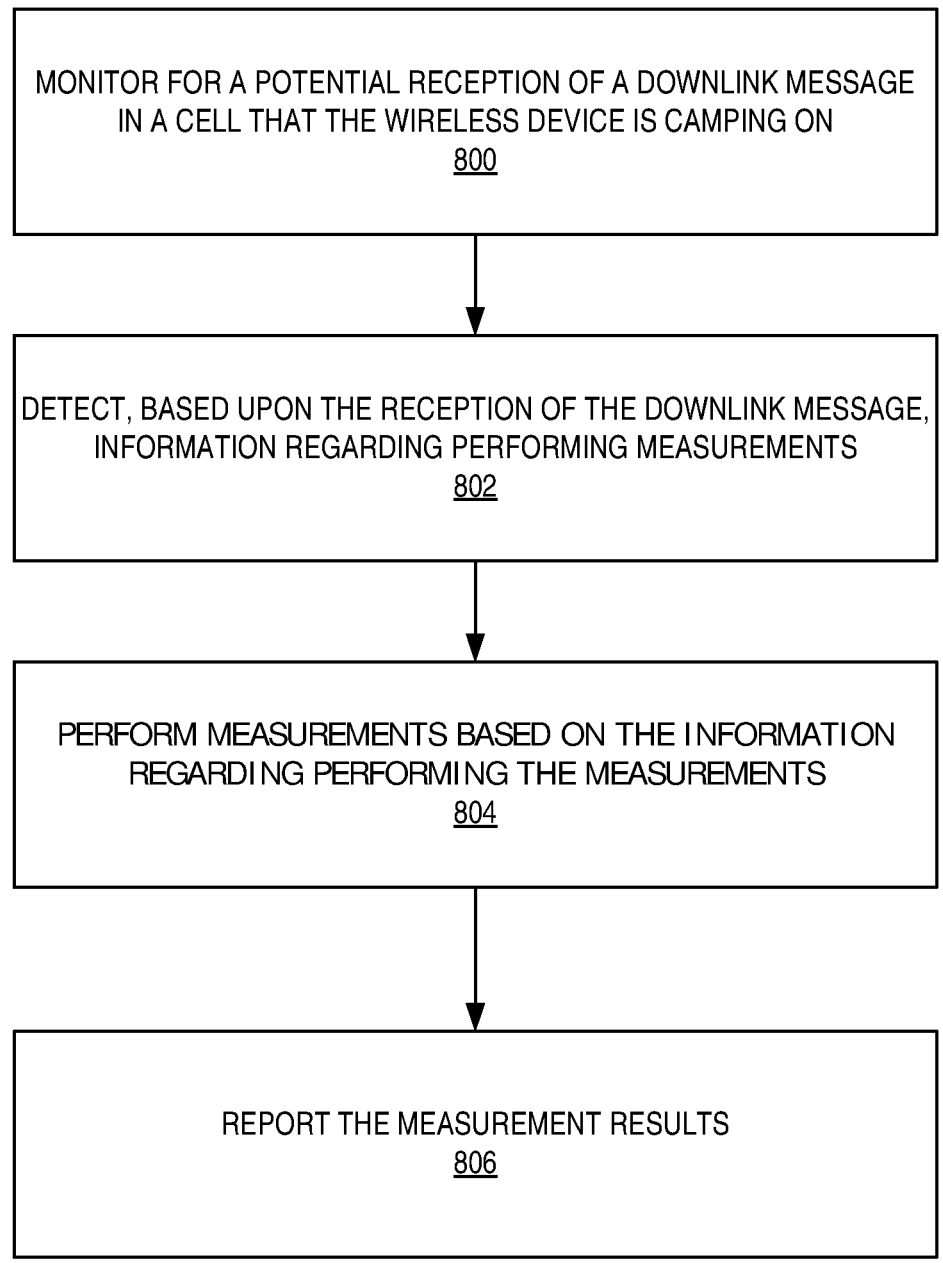
FIGS. 8 and 9 illustrate methods performed by a wireless device for performing measurements, according to some embodiments of the present disclosure.
Figure 9:
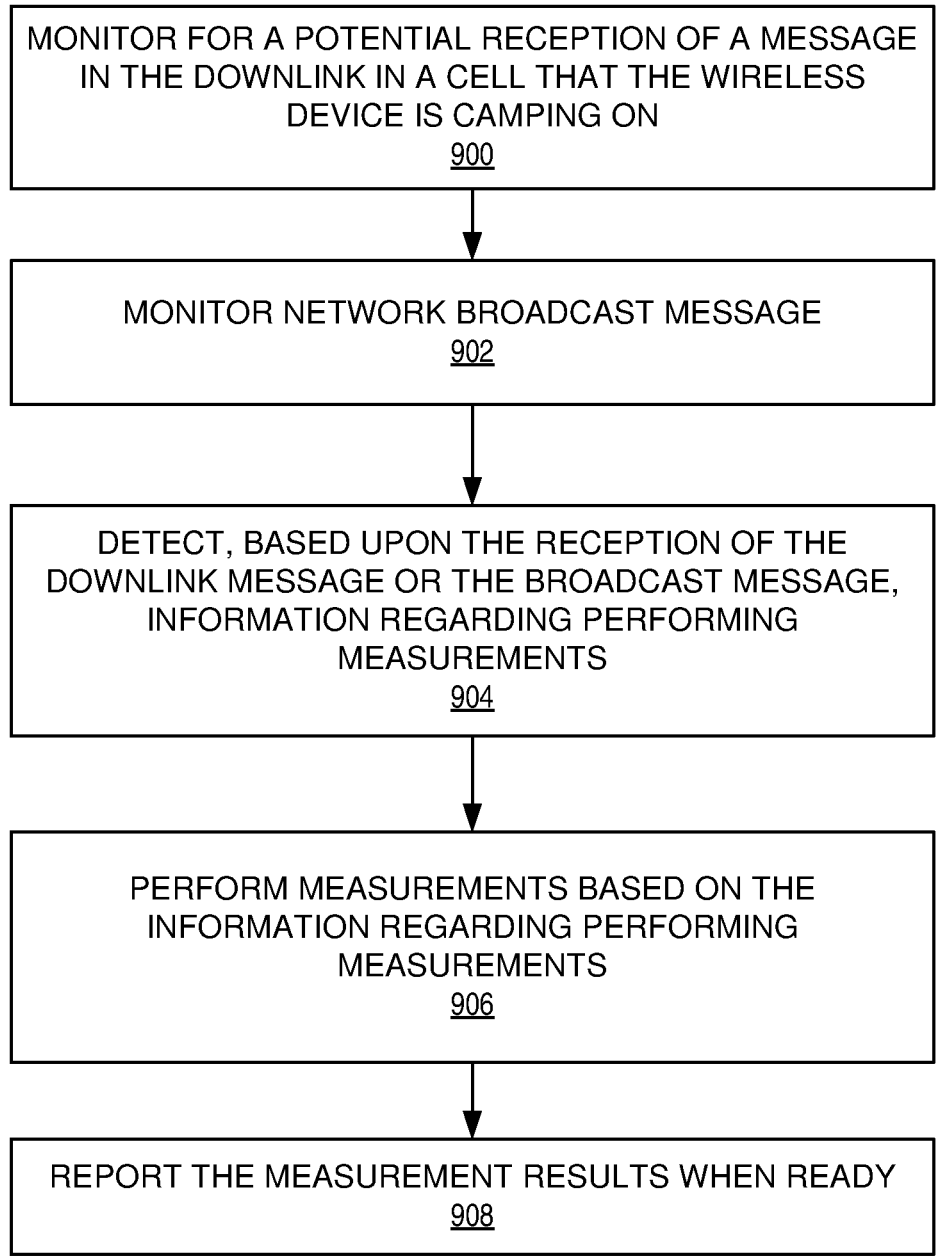

There are, proposed herein, various embodiments which address one or more of the issues disclosed herein. Systems and methods for triggering measurements before the completion of connection resumption are provided. FIGS. 8 and 9 illustrate methods performed by a wireless device for performing measurements, according to some embodiments of the present disclosure. In some embodiments, a method performed by a wireless device for performing measurements where a current Radio Resource Control (RRC) status is: IDLE or INACTIVE. The method includes monitoring for a potential reception of a downlink message in a cell that the wireless device is camping on (step 800); detecting, based upon the reception of the downlink message, information regarding performing measurements (step 802); performing measurements based on the information regarding performing the measurements (step 804); and reporting the measurement results (step 806). In this way, latency might be reduced to start performing measurements. This early availability of measurements at the target cell might increase the speed at which the wireless device acquires wireless connections such as Carrier Aggregation (CA) or Dual Connectivity (DC) connections. In some embodiments, the measurement results are reported based on one or more of an indication/request from the network, when the wireless device resumes, etc.

FIG. 9 illustrates a method performed by a wireless device for performing measurements. In some embodiments, the method includes monitoring for a potential reception of a message in the downlink in a cell that the wireless device is camping on (step 900); monitoring network broadcast message (step 902); detecting, based upon the reception of the downlink message or the broadcast message, information regarding performing measurements (step 904); performing measurements based on the information regarding performing measurements (step 906); and reporting the measurement results (step 908).

In some embodiments, the potential reception of a message is a potential reception of a paging message or any other message multiplexed with the paging message. In some embodiments, the network broadcast message is a SIB4. In some embodiments, the information regarding performing measurements comprises an indication to resume measurements according to a stored configuration in the wireless device. In some embodiments, the stored configuration is stored in a UE AS Context.

In some embodiments, the information regarding performing measurements comprises a measurement configuration that indicates that the wireless device shall perform new measurements according to the configuration received. In some embodiments, the measurement configuration provided may comprise lists of measurement objects, report configuration, measurement identifiers, associations between these, etc.

In some embodiments, if the received indication was to restore the measurement configuration, the method also includes restoring the stored measurement configuration. In some embodiments, if a measurement configuration was included, the method includes restoring the stored measurement configuration and applying the received measurement configuration on top of it. In some embodiments, applying the received measurement configuration on top of it comprises either as a delta or full configuration. In some embodiments, the decision of a delta or full configuration is based on a need code structure in MeasConfig IE.

In some embodiments, reporting the measurement results comprises waiting until after security is activated.

Figure 10:
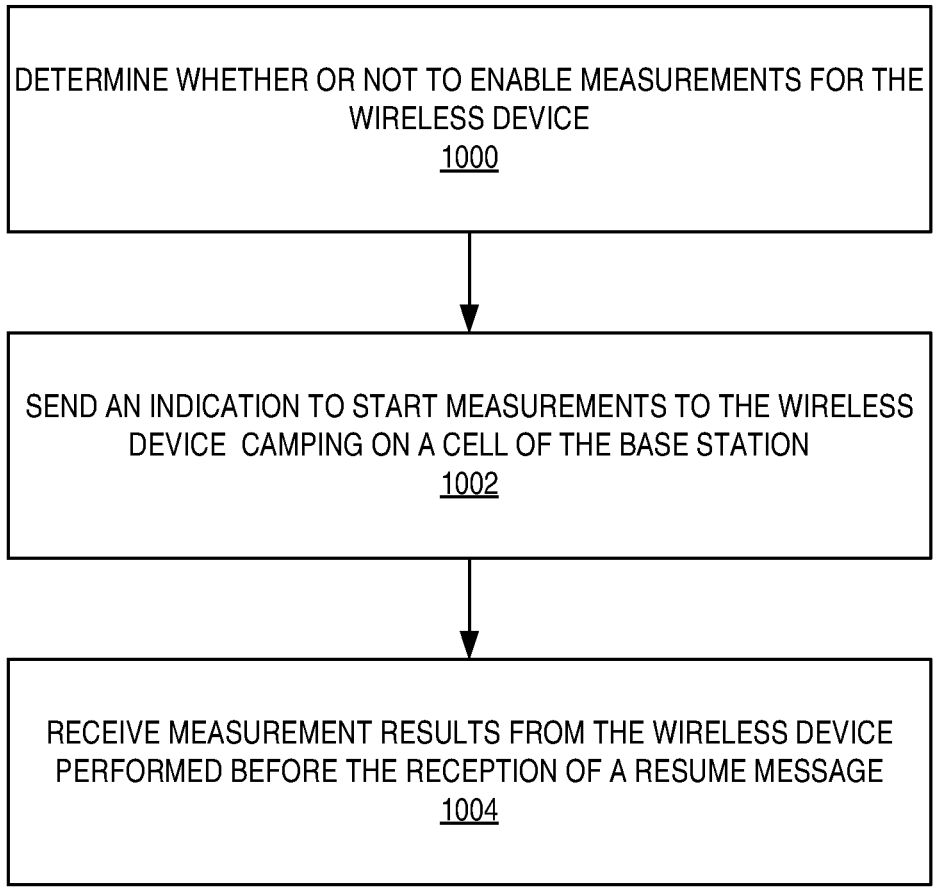
FIGS. 10 and 11 illustrate methods performed by a base station for enabling measurements, according to some embodiments of the present disclosure.
Figure 11:
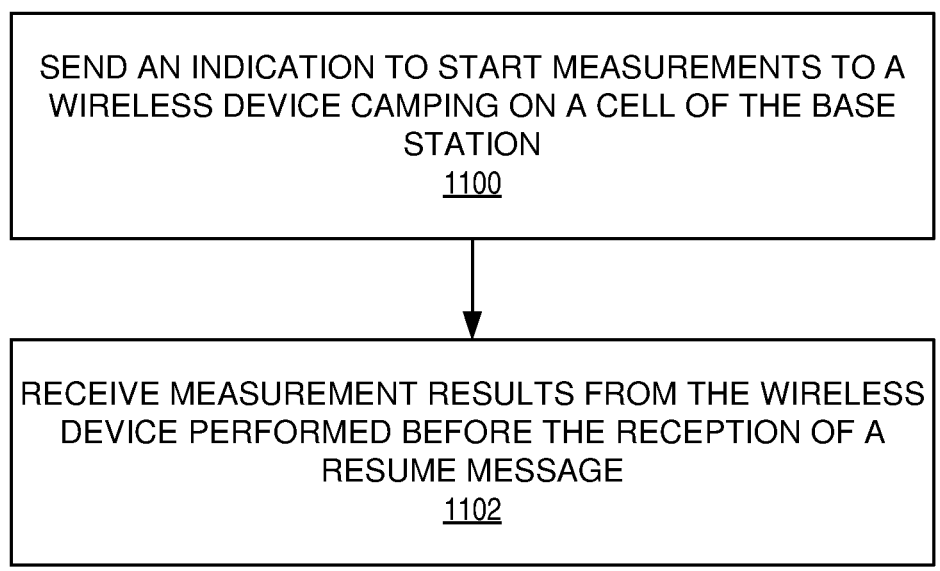

Systems and methods for triggering measurements before the completion of connection resumption are provided. FIGS. 10 and 11 illustrate methods performed by a base station for enabling measurements, according to some embodiments of the present disclosure. In some embodiments, a method performed by a base station for enabling measurements for a wireless device where a current RRC status of the wireless device is: IDLE or INACTIVE. The method includes determining whether or not to enable measurements for the wireless device (step 1000); sending an indication to start measurements to the wireless device camping on a cell of the base station (1002); and receiving measurement results from the wireless device performed before the reception of a resume message (step 1004). In this way, latency might be reduced to start performing measurements. This early availability of measurements at the target cell might increase the speed at which the wireless device acquires wireless connections such as CA or DC connections.

FIG. 11 illustrates a method performed by a base station for enabling measurements. In some embodiments, the method includes sending an indication to start measurements to a wireless device camping on a cell of the base station (step 1100); and receiving measurement results from the wireless device performed before the reception of a resume message (step 1102).

Certain embodiments may provide one or more of the following technical advantage(s). Embodiments disclosed herein enable the UE to start performing connected mode measurements upon the reception of a paging like message in a target cell. Compared to the state of the art solution, where that would only be possible upon the reception of the RRC Resume like message, a gain in latency of at least 2 radio Round Trip Times (RTTs) (i.e., RACH preamble, RAR, Resume Request, Resume) to start performing measurements is achieved, which may be quite valuable for early availability of measurements at the target cell, according to a configuration possibly decided by target, which may be according to the target's capabilities e.g., its supported carriers and/or exact SCells. The 2 radio RTT is actually the lower end of expected performance enhancement, because the RAR may not succeed in just one attempt and UE has to do some power ramping before that succeeds, and also tens of milliseconds may elapse, depending on network load and radio conditions, between the sending of the resume request and the reception of the resume message. So in reality, the methods proposed by embodiments disclosed herein may end up making the measurement results available to the network 100s of milliseconds earlier as compared to the legacy way of starting the measurement after receiving the resume message.

In several aspects of the embodiments disclosed herein, the design of the measurement configuration parameters provided from the NW to the UE requires much less effort from the NW operators. This is due to that the configuration is provided locally from the node that is interested in receiving the measurement results rather than from a distant node (e.g., where the UE got suspended). Furthermore, no validity timer/area is limiting the proposed solution for setting up CA/DC as it is based on configuration relevant in the area received and measurements triggered by the UE just before setting up a connection. Lastly in some aspects outlined in the embodiments disclosed herein, the UE has a chance to choose specific carriers beneficial in terms of UE power saving among NW provided carriers.

In the some embodiments, the network indicates in the paging message the UE to resume performing measurements according to the configuration the UE has stored upon being suspended.

In a second embodiment, the network includes a measurement configuration into the paging message. In another embodiment, more than one configuration can be included in the paging message where each measurements configuration may include different parameters, carriers and/or cells to measure, and, in general, different level of accuracy for the measurements. Yet, in another embodiment, if the UE has been previously configured with more than one measurement configuration before going to RRC_IDLE or RRC_INACTIVE, the network can add in the paging message an indication to the UE on what configuration need to be used/activated.

In one embodiment, a complete measurement configuration is included within the paging message (e.g., the entire measConfig). In another embodiment, due to the limitation on the paging message size, only a subset of selected fields within measConfig is included. Yet, in another embodiment, no measConfig is included in the paging message but only the selected fields that need to be signaled. In yet another embodiment, the measurement configuration is included in a separate message. Such a separate message may either be addressed to several different UEs or only be addressed to a single UE. In the latter case, the message can then be sent to the UE using a security key to support security at the configuration. In one alternative the scheduling of the separate message with the measurement configuration is scheduled within the paging message. In another alternative it is transmitted at a predefined occasion, e.g., related to where the paging message is transmitted. In yet another alternative the UE uses a specific identity to search for a scheduling (for the message) on the PDCCH, where the identity may be included e.g., in the paging message.

In one embodiment, these measurement-related parameters are included (by delta signaling) to the current measurement configuration used by the UE. In another embodiment, these measurement-related parameters are considered as a new measurement configuration (basically the UE builds a new measConfig with this subset of parameters received). This can be indicated either explicitly one by one (e.g., all the old measurements are removed explicitly via the inclusion of IEs such as measIdToRemoveList, measObjectToRemoveList, etc. and new ones added via measIdToAddModList, measObjectToAddRemoveList, etc.) or implicitly via a new flag (e.g., fullconfigmeas) that is added in the measurementConfiguration.

In further embodiments, the network could use the same embodiments that are described above to stop/suspend measurements which are dedicated to fast CA/DC setup. This could be due to a policy change regarding a specific UE or a network or due to a temporary load condition in the network. In case of stopping the measurements, the measurement configuration could be completely removed from the UE and network memories. In case of suspending measurements, the measurement configuration can be stored by the UE and the network but not applied by the UE.

Examples of Possible Implementations

Case 1. The network includes an indication within the paging message for the UE to start performing measurements according to the stored UE context The following is an example of implementation for the case where the network includes the indication for the UE to resume measurements according to stored configuration in the UE context. The specification into which the following should be implemented is 3GPP TS 38.331.

The purpose of this procedure is to transmit paging information to a UE in RRC_IDLE or RRC_INACTIVE.

The network initiates the paging procedure by transmitting the Paging message at the UE's paging occasion as specified in TS 38.304. The network may address multiple UEs within a Paging message by including one PagingRecord for each UE.

Reception of the Paging Message by the UE

Upon receiving the Paging message, the UE shall:
1> if in RRC_IDLE, for each of the PagingRecord, if any, included in the Paging message:
  2> if the UE-Identity included in the PagingRecord matches the UE identity allocated by upper layers:
    3> forward the UE-Identity and access Type (if present) to the upper layers;
    3> if startMeas is included in the PagingRecord:
      4> restore the measurement configuration from the stored UE AS context and start performing the measurements as specified in 5.5.2;
1> if in RRC_INACTIVE, for each of the PagingRecord, if any, included in the Paging message:
  2> if the UE-Identity included in the PagingRecord matches the UE's stored full-ANTI:
    3> if startMeas is included in the PagingRecord:
      4> restore the measurement configuration from the stored UE AS context and start performing the measurements as specified in 5.5.2;
    3> if the UE is configured by upper layers with access identity 1:
      4> initiate the RRC connection resumption procedure according to 5.3.13 with resumeCause set to MPS-PriorityAccess;
    3> else if the UE is configured by upper layers with access identity 2:
      4> initiate the RRC connection resumption procedure according to 5.3.13 with resumeCause set to MCS-PriorityAccess;
    3> else if the UE is configured by upper layers with one or more access identities equal to 11-15:
      4> initiate the RRC connection resumption procedure according to 5.3.13 with resumeCause set to highPriorityAccess;
    3> else:
      4> initiate the RRC connection resumption procedure according to 5.3.13 with resumeCause set to mt-Access;
  2> else if the UE-Identity included in the PagingRecord matches the UE identity allocated by upper layers:
    3> forward the UE-Identity to upper layers and accessType (if present) to the upper layers;
    3> perform the actions upon going to RRC_IDLE as specified in 5.3.11 with release cause 'other'.

Paging

The Paging message is used for the notification of one or more UEs.

Signalling radio bearer: N/A
   RLC-SAP: TM
   Logical channel: PCCH
   Direction: Network to UE

| Paging message |
| --- |

```
-- ASN1START
-- TAG-PAGING-START
Paging ::=                SEQUENCE {
    pagingRecordList            PagingRecordList        OPTIONAL, -- Need N
    lateNonCriticalExtension    OCTET STRING            OPTIONAL,
    nonCriticalExtension        SEQUENCE{ }             OPTIONAL
}
PagingRecordList ::=      SEQUENCE (SIZE(1..maxNrofPageRec)) OF PagingRecord
PagingRecord ::=          SEQUENCE {
    ue-Identity                 PagingUE-Identity,
    accessType                  ENUMERATED {non3GPP}    OPTIONAL,  -- Need N
    ...
    [[ startMeas                ENUMERATED {true}       OPTIONAL,  -- Need N
    ]]
}
PagingUE-Identity ::=     CHOICE {
    ng-5G-S-TMSI                NG-5G-S-TMSI,
    fullI-RNTI                  I-RNTI-Value,
    ...
}
-- TAG-PAGING-STOP
-- ASN1STOP
```

| PagingRecord field descriptions |
| --- |
| accessType |
| It indicates whether Paging is originated due to the PDU sessions from the non-3GPP access. |

In another realization, just one startMeas indication is included in the paging message and is applicable to all the UEs being paged.

| Paging message |
| --- |

```
-- ASN1START
-- TAG-PAGING-START
Paging ::=                SEQUENCE {
    pagingRecordList            Paging RecordList       OPTIONAL, -- Need N
    lateNonCriticalExtension    OCTET STRING            OPTIONAL,
    nonCriticalExtension        Paging-v16xy-IEs        OPTIONAL
}
Paging-v16xy-IEs ::=              SEQUENCE {
    startMeas                   ENUMERATED {true}       OPTIONAL,  -- Need N
    nonCriticalExtension        SEQUENCE { }            OPTIONAL
}
PagingRecordList ::=      SEQUENCE (SIZE(1..maxNrofPageRec)) OF PagingRecord
Paging Record :: =        SEQUENCE {
    ue-Identity                 PagingUE-Identity,
    accessType                  ENUMERATED {non3GPP}    OPTIONAL,  -- Need N
    ...
```

| Paging message |
|---|

```
}
PagingUE-Identity ::=      CHOICE {
    ng-5G-S-TMSI              NG-5G-S-TMSI,
    fullI-RNTI                I-RNTI-Value,
    ...
}
-- TAG-PAGING-STOP
-- ASN1STOP
```

The paging procedure then will look like the one shown below:
Reception of the Paging message by the UE
Upon receiving the Paging message, the UE shall:
1> if in RRC_IDLE, for each of the PagingRecord, if any, included in the Paging message:
  2> if the UE-Identity included in the PagingRecord matches the UE identity allocated by upper layers:
    3> forward the UE-Identity and access Type (if present) to the upper layers;
    3> if startMeas is included in the received paging message:
      4> restore the measurement configuration from the stored UE AS context and start performing the measurements as specified in 5.5.2;
1> if in RRC_INACTIVE, for each of the PagingRecord, if any, included in the Paging message:
  2> if the UE-Identity included in the PagingRecord matches the UE's stored full-RNTI:
    3> if startMeas is included in the received paging message:
      4> restore the measurement configuration from the stored UE AS context and start performing the measurements as specified in 5.5.2;
    3> if the UE is configured by upper layers with access identity 1:
      4> initiate the RRC connection resumption procedure according to 5.3.13 with resumeCause set to MPS-PriorityAccess;
    3> else if the UE is configured by upper layers with access identity 2:
      4> initiate the RRC connection resumption procedure according to 5.3.13 with resumeCause set to MCS-PriorityAccess;
    3> else if the UE is configured by upper layers with one or more access identities equal to 11-15:
      4> initiate the RRC connection resumption procedure according to 5.3.13 with resumeCause set to highPriorityAccess;
    3> else:
      4> initiate the RRC connection resumption procedure according to 5.3.13 with resumeCause set to mt-Access;
  2> else if the UE-Identity included in the PagingRecord matches the UE identity allocated by upper layers:
    3> forward the UE-Identity to upper layers and accessType (if present) to the upper layers;
    3> perform the actions upon going to RRC_IDLE as specified in 5.3.11 with release cause 'other'.

Case 2: The network includes the measurement configuration within the paging message
The following is an example of implementation for the case where the network includes the measurement configuration within the paging message. The specification into which the following should be implemented is 3GPP TS 38.331.

The purpose of this procedure is to transmit paging information to a UE in RRC_IDLE or RRC_INACTIVE.
The network initiates the paging procedure by transmitting the Paging message at the UEs paging occasion as specified in TS 38.304. The network may address multiple UEs within a Paging message by including one PagingRecord for each UE.

5.3.2.3 Reception of the Paging message by the UE
Upon receiving the Paging message, the UE shall:
1> if in RRC_IDLE, for each of the PagingRecord, if any, included in the Paging message:
  2> if the UE-Identity included in the PagingRecord matches the UE identity allocated by upper layers:
    3> forward the UE-Identity and accessType (if present) to the upper layers;
  2> if measConfig is included in the PagingRecord:
    3> restore the measurement configuration from the stored UE AS context;
    3> apply the included measConfig according to the measurement configuration procedure as specified in 5.5.
1> if in RRC_INACTIVE, for each of the PagingRecord, if any, included in the Paging message:
  2> if the UE-Identity included in the PagingRecord matches the UEs stored full-RNTI:
    3> if measConfig is included in the PagingRecord:
      3> restore the measurement configuration from the stored UE AS context;
      3> apply the included measConfig according to the measurement configuration procedure as specified in 5.5.;
    3> if the UE is configured by upper layers with access identity 1:
      4> initiate the RRC connection resumption procedure according to 5.3.13 with resumeCause set to MPS-PriorityAccess;
    3> else if the UE is configured by upper layers with access identity 2:
      4> initiate the RRC connection resumption procedure according to 5.3.13 with resumeCause set to MCS-PriorityAccess;
    3> else if the UE is configured by upper layers with one or more access identities equal to 11-15:
      4> initiate the RRC connection resumption procedure according to 5.3.13 with resumeCause set to highPriorityAccess;
    3> else:
      4> initiate the RRC connection resumption procedure according to 5.3.13 with resumeCause set to mt-Access;

2> else if the UE-Identity included in the PagingRecord matches the UE identity allocated by upper layers:
   3> forward the UE-Identity to upper layers and accessType (if present) to the upper layers;
   3> perform the actions upon going to RRC_IDLE as specified in 5.3.11 with release cause 'other'.

Paging

The Paging message is used for the notification of one or more UEs.

Signaling radio bearer: N/A
RLC-SAP: TM
Logical channel: PCCH
Direction: Network to UE

| Paging message |
|---|
| -- ASN1START<br>-- TAG-PAGING-START<br>Paging ::=                SEQUENCE {<br>  pagingRecordList           PagingRecordList                          OPTIONAL, -- Need N<br>  lateNonCriticalExtension   OCTET STRING                              OPTIONAL,<br>  nonCriticalExtension       SEQUENCE{ }                               OPTIONAL<br>}<br>PagingRecordList ::=       SEQUENCE (SIZE(1..max Nrof Page Rec)) OF PagingRecord<br>PagingRecord :: =          SEQUENCE {<br>  ue-Identity                PagingUE-Identity,<br>  accessType                 ENUMERATED {non3GPP} OPTIONAL,    -- Need N<br>  ...<br>  [[ measConfig M            MeasConfig              OPTIONAL,    -- Need<br>  ]]<br>}<br>PagingUE-Identity ::=      CHOICE {<br>  ng-5G-S-TMSI               NG-5G-S-TMSI,<br>  fullI-RNTI                 I-RNTI-Value,<br>  ...<br>}<br>-- TAG-PAGING-STOP<br>-- ASN1STOP |

| PagingRecord field descriptions |
|---|
| accessType |
| It indicates whether Paging is originated due to the PDU sessions from the non-3GPP access. |

Measurement configuration that may be transmitted in a message transmitted in a paging like channel In the embodiments disclosed herein, what is called a paging like channel may be the paging channel. And, the measurement configuration may be a field called measConfig with MeasConfigIE, as shown below:

MeasConfig

The IE MeasConfig specifies measurements to be performed by the UE, and covers intra-frequency, inter-frequency and inter-RAT mobility as well as configuration of measurement gaps.

| MeasConfig information element |
|---|
| -- ASN1START<br>-- TAG-MEASCONFIG-START<br>MeasConfig ::=                SEQUENCE {<br>  measObjectToRemoveList       MeasObjectToRemoveList<br>  OPTIONAL, -- Need N<br>  measObjectToAddModList       MeasObjectToRemoveList<br>  OPTIONAL, -- Need N<br>  reportConfigToRemoveList     ReportConfigToRemoveList<br>  OPTIONAL, -- Need N<br>  reportConfigToAddModList     ReportConfigToAddModList<br>  OPTIONAL, -- Need N<br>  measIdToRemoveList           MeasIdToRemoveList<br>  OPTIONAL, -- Need N<br>  measIdToAddModList           MeasIdToAddModList<br>  OPTIONAL, -- Need N<br>  s-MeasureConfig              CHOICE {<br>    ssb-RSRP                   RSRP-Range, |

```
   csi-RSRP                RSRP-Range
 }                                                     OPTIONAL, -
- Need M
  quantityConfig           QuantityConfig
OPTIONAL,   -- Need M
  measGapConfig            MeasGapConfig
OPTIONAL,   -- Need M
  measGapSharingConfig              MeasGapSharingConfig
OPTIONAL,   -- Need M
  ...
}
MeasObjectToRemoveList ::=          SEQUENCE (SIZE (1..maxNrofObjectId)) OF
MeasObjectId
MeasIdToRemoveList ::=              SEQUENCE (SIZE (1..maxNrofMeasId)) OF MeasId
ReportConfigToRemoveList ::=        SEQUENCE (SIZE (1..maxReportConfigId)) OF
ReportConfigId
-- TAG-MEASCONFIG-STOP
-- ASN1STOP
```

| MeasConfig field descriptions |
|---|
| measGapConfig |
| Used to setup and release measurement gaps in NR.<br>measIdToAddModList |
| List of measurement identities to add and/or modify.<br>measIdToRemoveList |
| List of measurement identities to remove.<br>measObjectToAddModList |
| List of measurement objects to add and/or modify.<br>measObjectToRemoveList |
| List of measurement objects to remove.<br>reportConfigToAddModList |
| List of measurement reporting configurations to add and/or modify<br>reportConfigToRemoveList |
| List of measurement reporting configurations to remove.<br>s-MeasureConfig |
| Threshold for NR SpCell RSRP measurement controlling when the UE is required to perform measurements on non-serving cells. Choice of ssb-RSRP corresponds to cell RSRP based on SS/PBCH block and choice of csi-RSRP corresponds to cell RSRP of CSI-RS.<br>MeasGapSharingConfig |
| The IE MeasGapSharingConfig specifies the measurement gap sharing scheme |

Notice that the need codes apply as if the empty field is included i.e., if UE has stored measurement configurations, these shall be restored and measurements accordingly shall be resumed.

Note that it may not be necessary to use the full measConfig for the measurements to be configured via paging. For example, what the network needs could be just information about some carriers. So the measConfig could be just a list of carrier frequencies to measure and the UE reports the signal level of the top n cells on each frequency. If such an approach is to be taken, an early measurement configuration (e.g., earlyMeasConfig) IE needs to be specified that includes the required IE (in the example case, containing just a list of frequencies) and the UE measurement procedure needs to be updated to handle such measurement configurations. An advantage of having such a simplified approach is that the measurement configuration can be included only once in the paging message and could be applicable to all the UEs An example ASN.1 is shown below

| Paging message |
|---|
| ```
-- ASN1START
-- TAG-PAGING-START
Paging ::=               SEQUENCE {
  pagingRecord List           Paging RecordList
OPTIONAL, -- Need N
  lateNonCriticalExtension           OCTET STRING
OPTIONAL,
``` |

-continued

| Paging message | |
|---|---|
| nonCriticalExtension<br>OPTIONAL<br>} | Paging-v16xy-IEs |
| Paging-v16xy-IEs ::=<br>   measConfig<br>nonCriticalExtension<br>OPTIONAL<br>} | SEQUENCE {<br>EarlyMeasConfig        OPTIONAL,  -- Need N<br>SEQUENCE { } |
| PagingRecordList ::=<br>PagingRecord ::=<br>   ue-Identity<br>   accessType<br>...<br>} | SEQUENCE (SIZE(1..maxNrofPageRec)) OF PagingRecord<br>SEQUENCE {<br>PagingUE-Identity,<br>ENUMERATED {non3GPP}   OPTIONAL,  -- Need N |
| PagingUE-Identity ::=<br>   ng-5G-S-TMSI<br>   fullI-RNTI<br>...<br>} | CHOICE {<br>NG-5G-S-TMSI,<br>I-RNTI-Value, |
| EarlyMeasconfig ::=   SEQUENCE {<br>     freqToMeasure<br>...<br>}<br>-- TAG-PAGING-STOP<br>-- ASN1STOP | <br>SEQUENCE (SIZE (1..maxMeasFreqs)) OF NR-FreqInfo , |

Figure 12:
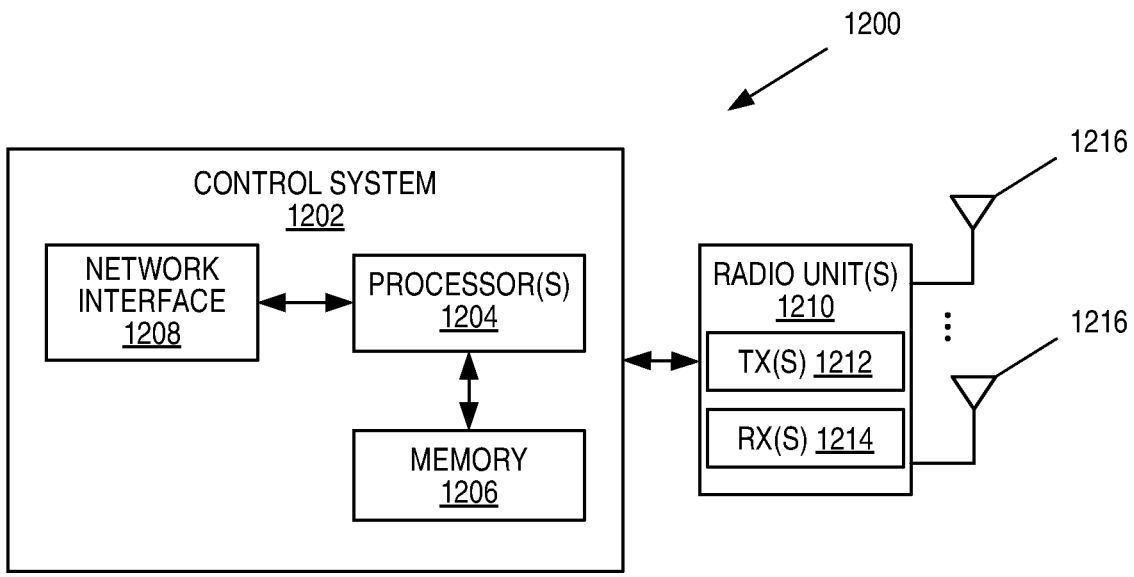
FIG. 12 is a schematic block diagram of a radio access node according to some embodiments of the present disclosure.

FIG. 12 is a schematic block diagram of a radio access node 1200 according to some embodiments of the present disclosure. The radio access node 1200 may be, for example, a base station 102 or 106. As illustrated, the radio access node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. In addition, the radio access node 1200 includes one or more radio units 1210 that each includes one or more transmitters 1212 and one or more receivers 1214 coupled to one or more antennas 1216. The radio units 1210 may be referred to or be part of radio interface circuitry. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of a radio access node 1200 as described herein. In some embodiments, the function(s) are implemented in software that is stored, e.g., in the memory 1206 and executed by the one or more processors 1204.

Figure 13:
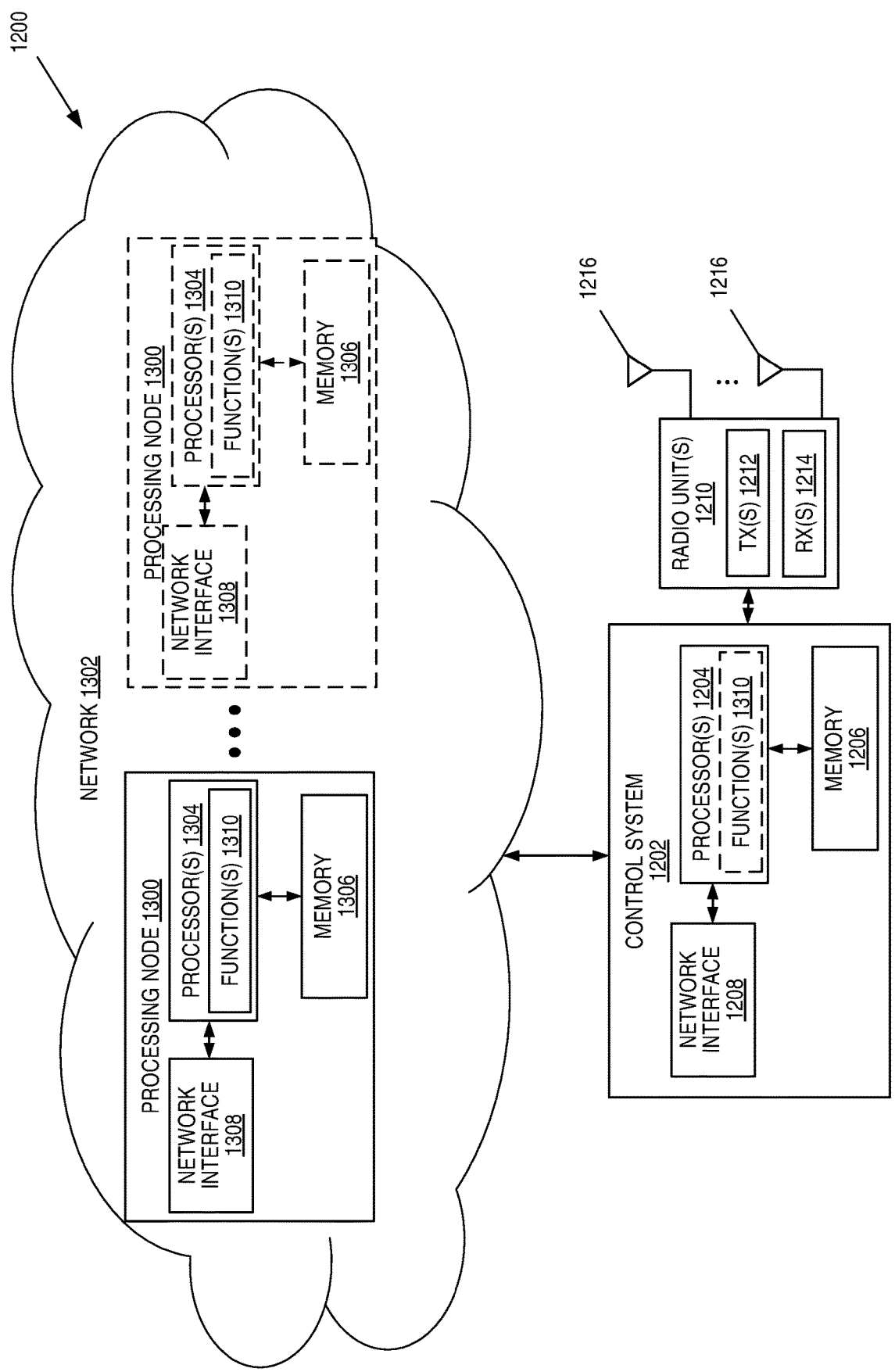
FIG. 13 is a schematic block diagram that illustrates a virtualized embodiment of the radio access node according to some embodiments of the present disclosure.

FIG. 13 is a schematic block diagram that illustrates a virtualized embodiment of the radio access node 1200 according to some embodiments of the present disclosure. This discussion is equally applicable to other types of network nodes. Further, other types of network nodes may have similar virtualized architectures.

As used herein, a "virtualized" radio access node is an implementation of the radio access node 1200 in which at least a portion of the functionality of the radio access node 1200 is implemented as a virtual component(s) (e.g., via a virtual machine(s) executing on a physical processing node(s) in a network(s)). As illustrated, in this example, the radio access node 1200 includes the control system 1202 that includes the one or more processors 1204 (e.g., CPUs, ASICs, FPGAs, and/or the like), the memory 1206, and the network interface 1208 and the one or more radio units 1210 that each includes the one or more transmitters 1212 and the one or more receivers 1214 coupled to the one or more antennas 1216, as described above. The control system 1202 is connected to the radio unit(s) 1210 via, for example, an optical cable or the like. The control system 1202 is connected to one or more processing nodes 1300 coupled to or included as part of a network(s) 1302 via the network interface 1208. Each processing node 1300 includes one or more processors 1304 (e.g., CPUs, ASICs, FPGAs, and/or the like), memory 1306, and a network interface 1308.

In this example, functions 1310 of the radio access node 1200 described herein are implemented at the one or more processing nodes 1300 or distributed across the control system 1202 and the one or more processing nodes 1300 in any desired manner. In some particular embodiments, some or all of the functions 1310 of the radio access node 1200 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicate directly with the processing node(s) 1300 via an appropriate network interface(s).

In some embodiments, a computer program including instructions which, when executed by at least one processor, causes the at least one processor to carry out the functionality of radio access node 1200 or a node (e.g., a processing node 1300) implementing one or more of the functions 1310 of the radio access node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
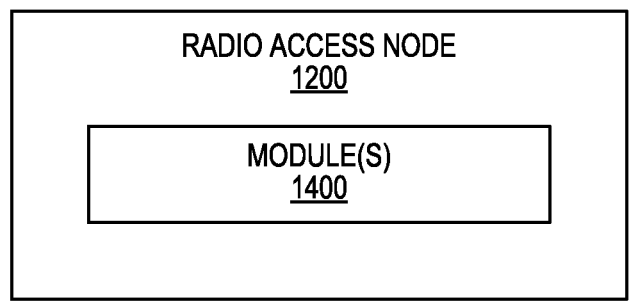
FIG. 14 is a schematic block diagram of the radio access node according to some other embodiments of the present disclosure.

FIG. 14 is a schematic block diagram of the radio access node 1200 according to some other embodiments of the present disclosure. The radio access node 1200 includes one or more modules 1400, each of which is implemented in software. The module(s) 1400 provide the functionality of the radio access node 1200 described herein. This discussion is equally applicable to the processing node 1300 of FIG. 13 where the modules 1400 may be implemented at one of the processing nodes 1300 or distributed across multiple processing nodes 1300 and/or distributed across the processing node(s) 1300 and the control system 1202.

Figure 15:
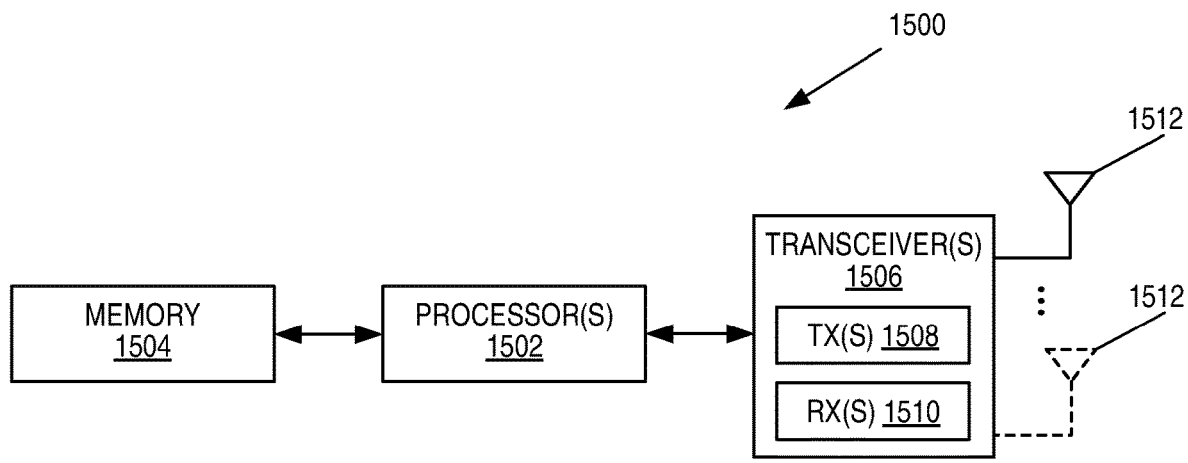
FIG. 15 is a schematic block diagram of a UE according to some embodiments of the present disclosure.

FIG. 15 is a schematic block diagram of a UE 1500 according to some embodiments of the present disclosure. As illustrated, the UE 1500 includes one or more processors 1502 (e.g., CPUs, ASICs, FPGAs, and/or the like), memory 1504, and one or more transceivers 1506 each including one or more transmitters 1508 and one or more receivers 1510 coupled to one or more antennas 1512. The transceiver(s) 1506 includes radio-front end circuitry connected to the antenna(s) 1512 that is configured to condition signals communicated between the antenna(s) 1512 and the processor(s) 1502, as will be appreciated by on of ordinary skill in the art. The processors 1502 are also referred to herein as processing circuitry. The transceivers 1506 are also referred to herein as radio circuitry. In some embodiments, the functionality of the UE 1500 described above may be fully or partially implemented in software that is, e.g., stored in the memory 1504 and executed by the processor(s) 1502. Note that the UE 1500 may include additional components not illustrated in FIG. 15 such as, e.g., one or more user interface components (e.g., an input/output interface including a display, buttons, a touch screen, a microphone, a speaker(s), and/or the like and/or any other components for allowing input of information into the UE 1500 and/or allowing output of information from the UE 1500), a power supply (e.g., a battery and associated power circuitry), etc.

In some embodiments, a computer program including instructions which, when executed by at least one processor, causes the at least one processor to carry out the functionality of the UE 1500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
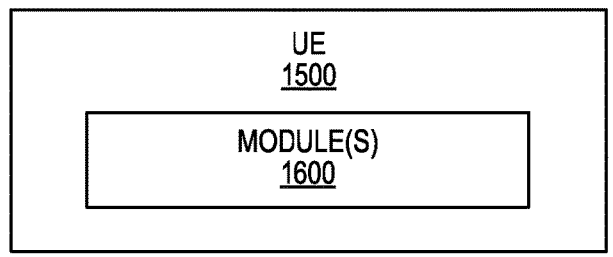
FIG. 16 is a schematic block diagram of the UE according to some other embodiments of the present disclosure.

FIG. 16 is a schematic block diagram of the UE 1500 according to some other embodiments of the present disclosure. The UE 1500 includes one or more modules 1600, each of which is implemented in software. The module(s) 1600 provide the functionality of the UE 1500 described herein.

Figure 17:
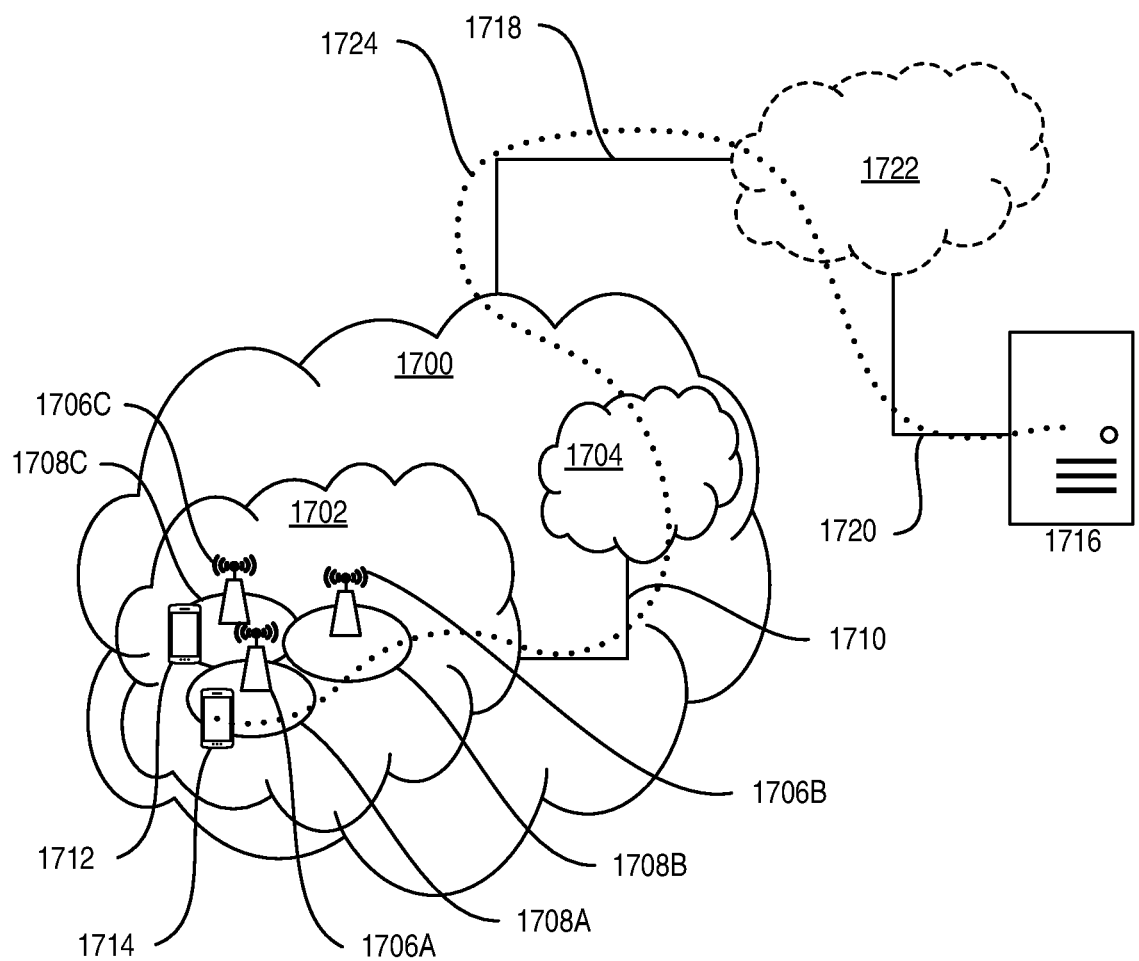
FIG. 17 illustrates a communication system including a telecommunication network, such as a 3GPP-type cellular network according to some embodiments of the present disclosure.

With reference to FIG. 17, in accordance with an embodiment, a communication system includes a telecommunication network 1700, such as a 3GPP-type cellular network, which comprises an access network 1702, such as a RAN, and a core network 1704. The access network 1702 comprises a plurality of base stations 1706A, 1706B, 1706C, such as NBs, eNBs, gNBs, or other types of wireless Access Points (APs), each defining a corresponding coverage area 1708A, 1708B, 1708C. Each base station 1706A, 1706B, 1706C is connectable to the core network 1704 over a wired or wireless connection 1710. A first UE 1712 located in coverage area 1708C is configured to wirelessly connect to, or be paged by, the corresponding base station 1706C. A second UE 1714 in coverage area 1708A is wirelessly connectable to the corresponding base station 1706A. While a plurality of UEs 1712, 1714 are illustrated in this example, the disclosed embodiments are equally applicable to a situation where a sole UE is in the coverage area or where a sole UE is connecting to the corresponding base station 1706.

The telecommunication network 1700 is itself connected to a host computer 1716, which may be embodied in the hardware and/or software of a standalone server, a cloud-implemented server, a distributed server, or as processing resources in a server farm. The host computer 1716 may be under the ownership or control of a service provider, or may be operated by the service provider or on behalf of the service provider. Connections 1718 and 1720 between the telecommunication network 1700 and the host computer 1716 may extend directly from the core network 1704 to the host computer 1716 or may go via an optional intermediate network 1722. The intermediate network 1722 may be one of, or a combination of more than one of, a public, private, or hosted network; the intermediate network 1722, if any, may be a backbone network or the Internet; in particular, the intermediate network 1722 may comprise two or more sub-networks (not shown).

The communication system of FIG. 17 as a whole enables connectivity between the connected UEs 1712, 1714 and the host computer 1716. The connectivity may be described as an Over-the-Top (OTT) connection 1724. The host computer 1716 and the connected UEs 1712, 1714 are configured to communicate data and/or signaling via the OTT connection 1724, using the access network 1702, the core network 1704, any intermediate network 1722, and possible further infrastructure (not shown) as intermediaries. The OTT connection 1724 may be transparent in the sense that the participating communication devices through which the OTT connection 1724 passes are unaware of routing of uplink and downlink communications. For example, the base station 1706 may not or need not be informed about the past routing of an incoming downlink communication with data originating from the host computer 1716 to be forwarded (e.g., handed over) to a connected UE 1712. Similarly, the base station 1706 need not be aware of the future routing of an outgoing uplink communication originating from the UE 1712 towards the host computer 1716.

Example implementations, in accordance with an embodiment, of the UE, base station, and host computer discussed in the preceding paragraphs will now be described with reference to FIG. 18. In a communication system 1800, a host computer 1802 comprises hardware 1804 including a communication interface 1806 configured to set up and maintain a wired or wireless connection with an interface of a different communication device of the communication system 1800. The host computer 1802 further comprises processing circuitry 1808, which may have storage and/or processing capabilities. In particular, the processing circuitry 1808 may comprise one or more programmable processors, ASICs, FPGAs, or combinations of these (not shown) adapted to execute instructions. The host computer 1802 further comprises software 1810, which is stored in or accessible by the host computer 1802 and executable by the processing circuitry 1808. The software 1810 includes a host application 1812. The host application 1812 may be operable to provide a service to a remote user, such as a UE 1814 connecting via an OTT connection 1816 terminating at the UE 1814 and the host computer 1802. In providing the service to the remote user, the host application 1812 may provide user data which is transmitted using the OTT connection 1816.

The communication system 1800 further includes a base station 1818 provided in a telecommunication system and comprising hardware 1820 enabling it to communicate with the host computer 1802 and with the UE 1814. The hardware 1820 may include a communication interface 1822 for setting up and maintaining a wired or wireless connection with an interface of a different communication device of the communication system 1800, as well as a radio interface 1824 for setting up and maintaining at least a wireless connection 1826 with the UE 1814 located in a coverage area (not shown in FIG. 18) served by the base station 1818. The communication interface 1822 may be configured to facilitate a connection 1828 to the host computer 1802. The connection 1828 may be direct or it may pass through a core network (not shown in FIG. 18) of the telecommunication system and/or through one or more intermediate networks outside the telecommunication system. In the embodiment shown, the hardware 1820 of the base station 1818 further includes processing circuitry 1830, which may comprise one or more programmable processors, ASICs, FPGAs, or combinations of these (not shown) adapted to execute instructions. The base station 1818 further has software 1832 stored internally or accessible via an external connection.

The communication system 1800 further includes the UE 1814 already referred to. The UE's 1814 hardware 1834 may include a radio interface 1836 configured to set up and maintain a wireless connection 1826 with a base station serving a coverage area in which the UE 1814 is currently located. The hardware 1834 of the UE 1814 further includes processing circuitry 1838, which may comprise one or more programmable processors, ASICs, FPGAs, or combinations of these (not shown) adapted to execute instructions. The UE 1814 further comprises software 1840, which is stored in or accessible by the UE 1814 and executable by the processing circuitry 1838. The software 1840 includes a client application 1842. The client application 1842 may be operable to provide a service to a human or non-human user via the UE 1814, with the support of the host computer 1802. In the host computer 1802, the executing host application 1812 may communicate with the executing client application 1842 via the OTT connection 1816 terminating at the UE 1814 and the host computer 1802. In providing the service to the user, the client application 1842 may receive request data from the host application 1812 and provide user data in response to the request data. The OTT connection 1816 may transfer both the request data and the user data. The client application 1842 may interact with the user to generate the user data that it provides.

Figure 18:
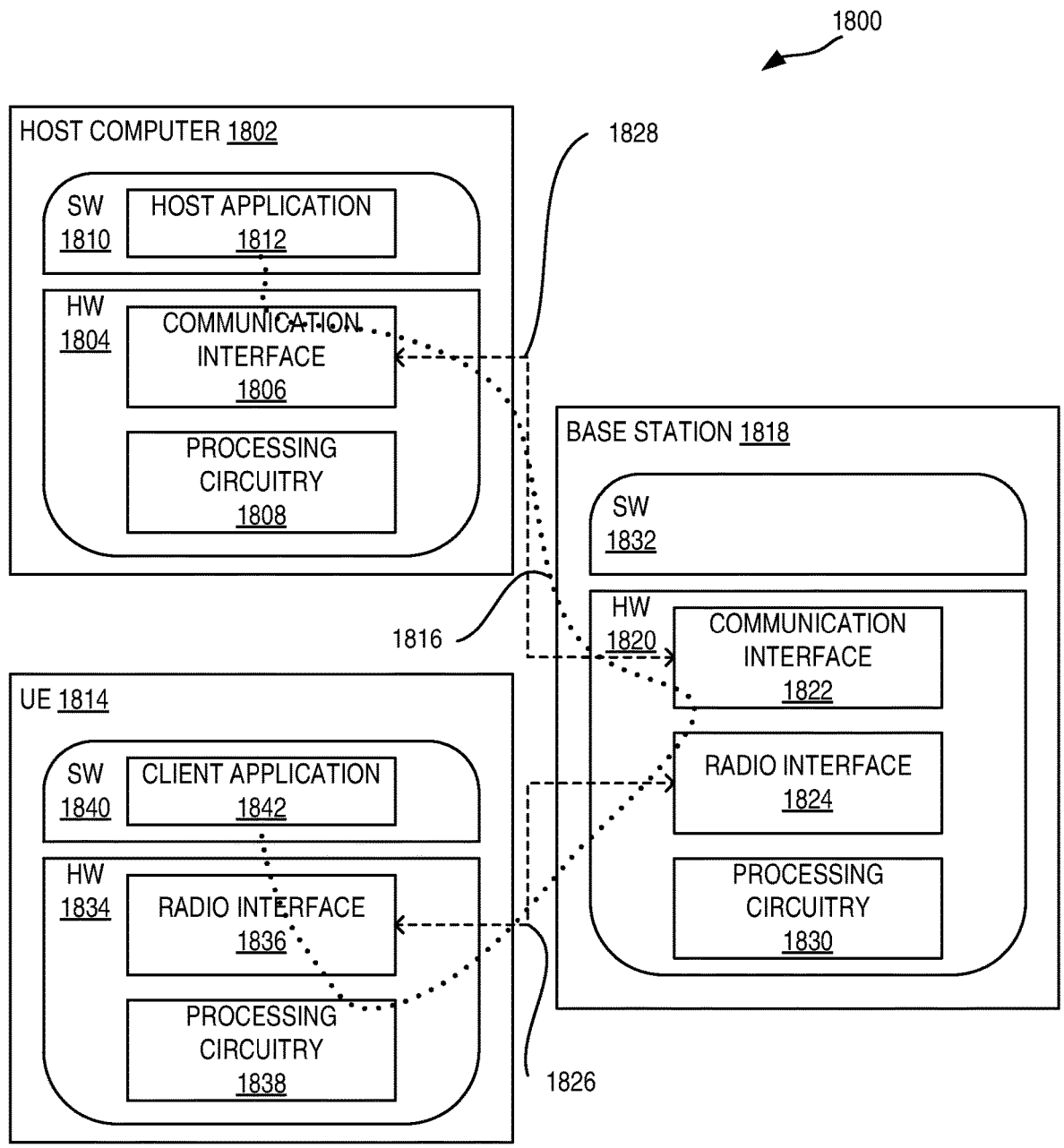
FIG. 18 illustrates a communication system including a host computer, according to some embodiments of the present disclosure.

It is noted that the host computer 1802, the base station 1818, and the UE 1814 illustrated in FIG. 18 may be similar or identical to the host computer 1716, one of the base stations 1706A, 1706B, 1706C, and one of the UEs 1712, 1714 of FIG. 17, respectively. This is to say, the inner workings of these entities may be as shown in FIG. 18 and independently, the surrounding network topology may be that of FIG. 17.

In FIG. 18, the OTT connection 1816 has been drawn abstractly to illustrate the communication between the host computer 1802 and the UE 1814 via the base station 1818 without explicit reference to any intermediary devices and the precise routing of messages via these devices. The network infrastructure may determine the routing, which may be configured to hide from the UE 1814 or from the service provider operating the host computer 1802, or both. While the OTT connection 1816 is active, the network infrastructure may further take decisions by which it dynamically changes the routing (e.g., on the basis of load balancing consideration or reconfiguration of the network).

The wireless connection 1826 between the UE 1814 and the base station 1818 is in accordance with the teachings of the embodiments described throughout this disclosure. One or more of the various embodiments improve the performance of OTT services provided to the UE 1814 using the OTT connection 1816, in which the wireless connection 1826 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 1816 between the host computer 1802 and the UE 1814, in response to variations in the measurement results. The measurement procedure and/or the network functionality for reconfiguring the OTT connection 1816 may be implemented in the software 1810 and the hardware 1804 of the host computer 1802 or in the software 1840 and the hardware 1834 of the UE 1814, or both. In some embodiments, sensors (not shown) may be deployed in or in association with communication devices through which the OTT connection 1816 passes; the sensors may participate in the measurement procedure by supplying values of the monitored quantities exemplified above, or supplying values of other physical quantities from which the software 1810, 1840 may compute or estimate the monitored quantities. The reconfiguring of the OTT connection 1816 may include message format, retransmission settings, preferred routing, etc.; the reconfiguring need not affect the base station 1818, and it may be unknown or imperceptible to the base station 1818. Such procedures and functionalities may be known and practiced in the art. In certain embodiments, measurements may involve proprietary UE signaling facilitating the host computer 1802's measurements of throughput, propagation times, latency, and the like. The measurements may be implemented in that the software 1810 and 1840 causes messages to be transmitted, in particular empty or 'dummy' messages, using the OTT connection 1816 while it monitors propagation times, errors, etc.

FIG. 19 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 19 will be included in this section. In step 1900, the host computer provides user data. In sub-step 1902 (which may be optional) of step 1900, the host computer provides the user data by executing a host application. In step 1904, the host computer initiates a transmission carrying the user data to the UE. In step 1906 (which may be optional), the base station transmits to the UE the user data which was carried in the transmission that the host computer initiated, in accordance with the teachings of the embodiments described throughout this disclosure. In step 1908 (which may also be optional), the UE executes a client application associated with the host application executed by the host computer.

FIG. 20 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 20 will be included in this section. In step 2000 of the method, the host computer provides user data. In an optional sub-step (not shown) the host computer provides the user data by executing a host application. In step 2002, the host computer initiates a transmission carrying the user data to the UE. The transmission may pass via the base station, in accordance with the teachings of the embodiments described throughout this disclosure. In step 2004 (which may be optional), the UE receives the user data carried in the transmission.

FIG. 21 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 21 will be included in this section. In step 2100 (which may be optional), the UE receives input data provided by the host computer. Additionally or alternatively, in step 2102, the UE provides user data. In sub-step 2104 (which may be optional) of step 2100, the UE provides the user data by executing a client application. In sub-step 2106 (which may be optional) of step 2102, the UE executes a client application which provides the user data in reaction to the received input data provided by the host computer. In providing the user data, the executed client application may further consider user input received from the user. Regardless of the specific manner in which the user data was provided, the UE initiates, in sub-step 2108 (which may be optional), transmission of the user data to the host computer. In step 2110 of the method, the host computer receives the user data transmitted from the UE, in accordance with the teachings of the embodiments described throughout this disclosure.

FIG. 22 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 22 will be included in this section. In step 2200 (which may be optional), in accordance with the teachings of the embodiments described throughout this disclosure, the base station receives user data from the UE. In step 2202 (which may be optional), the base station initiates transmission of the received user data to the host computer. In step 2204 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

1. A method performed by a wireless device for performing measurements, the method comprising at least one of:
   monitoring for a potential reception of a message in a downlink in a cell that the wireless device is camping on;
   monitoring a network broadcast message;
   detecting, based upon the reception of the downlink message or the broadcast message, information regarding performing measurements;
   performing the measurements based on the information regarding performing the measurements; and
   reporting the measurement results when ready.
2. The method of embodiment 1 wherein the potential reception of a message is a potential reception of a paging message or any other message multiplexed with the paging message.
3. The method of any of embodiments 1 to 2 wherein the network broadcast message is a SIB4.
4. The method of any of embodiments 1 to 3 wherein the information regarding performing measurements comprises an indication to resume measurements according to a stored configuration in the wireless device.
5. The method of embodiment 4 wherein the stored configuration is stored in a UE AS Context.
6. The method of any of embodiments 1 to 5 wherein the information regarding performing measurements comprises a measurement configuration that indicates that the wireless device shall perform new measurements according to the configuration received.
7. The method of embodiment 6 wherein the measurement configuration provided may comprise lists of measurement objects, report configuration, measurement identifiers, associations between these, etc.
8. The method of any of embodiments 1 to 7 further comprising, if the received indication was to restore the measurement configuration, restoring the stored measurement configuration.
9. The method of any of embodiments 1 to 8 further comprising, if a measurement configuration was included, restoring the stored measurement configuration and applying the received measurement configuration on top of it.
10. The method of embodiment 9 wherein applying the received measurement configuration on top of it comprises either as a delta or full configuration.
11. The method of embodiment 10 wherein the decision of a delta or full configuration is based on a need code structure in MeasConfig IE.
12. The method of any of embodiments 1 to 11 wherein reporting the measurement results when ready comprises waiting until after security is activated.

13. The method of any of the previous embodiments, further comprising:
providing user data; and
forwarding the user data to a host computer via the transmission to the base station.

Group B Embodiments

14. A method performed by a base station for enabling measurements, the method comprising at least one of:
sending an indication to start measurements to a wireless device camping on a cell of the base station; and
receiving measurement results from the wireless device performed before the reception of a resume message.
15. The method of embodiment 14 wherein the indication to start measurements is a paging message or any other message multiplexed with the paging message.
16. The method of any of embodiments 14 to 15 wherein the indication to start measurements is a network broadcast message such as a SIB4.
17. The method of any of embodiments 14 to 16 wherein the indication to start measurements comprises an indication to resume measurements according to a stored configuration in the wireless device.
18. The method of embodiment 17 wherein the stored configuration is stored in a UE AS Context.
19. The method of any of embodiments 14 to 18 wherein the indication to start measurements comprises a measurement configuration that indicates that the wireless device shall perform new measurements according to the configuration received.
20. The method of embodiment 19 wherein the measurement configuration provided may comprise lists of measurement objects, report configuration, measurement identifiers, associations between these, etc.
21. The method of any of embodiments 14 to 20 further comprising, if the indication to start measurements was to restore the measurement configuration, the wireless device restoring the stored measurement configuration.
22. The method of any of embodiments 14 to 21 further comprising, if a measurement configuration was included, the wireless device restoring the stored measurement configuration and applying the received measurement configuration on top of it.
23. The method of embodiment 22 wherein applying the received measurement configuration on top of it comprises either as a delta or full configuration.
24. The method of embodiment 23 wherein the decision of a delta or full configuration is based on a need code structure in MeasConfig IE.
25. The method of any of the previous embodiments, further comprising:
obtaining user data; and
forwarding the user data to a host computer or a wireless device.

Group C Embodiments

26. A wireless device for performing measurements, the wireless device comprising:
processing circuitry configured to perform any of the steps of any of the Group A embodiments; and
power supply circuitry configured to supply power to the wireless device.

27. A base station for enabling measurements, the base station comprising:
processing circuitry configured to perform any of the steps of any of the Group B embodiments; and
power supply circuitry configured to supply power to the base station.
28. A User Equipment, UE, for performing measurements, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.
29. A communication system including a host computer comprising:
processing circuitry configured to provide user data; and
a communication interface configured to forward the user data to a cellular network for transmission to a User Equipment, UE;
wherein the cellular network comprises a base station having a radio interface and processing circuitry, the base station's processing circuitry configured to perform any of the steps of any of the Group B embodiments.
30. The communication system of the previous embodiment further including the base station.
31. The communication system of the previous 2 embodiments, further including the UE, wherein the UE is configured to communicate with the base station.
32. The communication system of the previous 3 embodiments, wherein:
the processing circuitry of the host computer is configured to execute a host application, thereby providing the user data; and
the UE comprises processing circuitry configured to execute a client application associated with the host application.
33. A method implemented in a communication system including a host computer, a base station, and a User Equipment, UE, the method comprising:
at the host computer, providing user data; and
at the host computer, initiating a transmission carrying the user data to the UE via a cellular network comprising the base station, wherein the base station performs any of the steps of any of the Group B embodiments.
34. The method of the previous embodiment, further comprising, at the base station, transmitting the user data.
35. The method of the previous 2 embodiments, wherein the user data is provided at the host computer by executing a host application, the method further comprising, at the UE, executing a client application associated with the host application.
36. A User Equipment, UE, configured to communicate with a base station, the UE comprising a radio interface and processing circuitry configured to perform the method of the previous 3 embodiments.

37. A communication system including a host computer comprising:
processing circuitry configured to provide user data; and
a communication interface configured to forward user data to a cellular network for transmission to a User Equipment, UE;
wherein the UE comprises a radio interface and processing circuitry, the UE's components configured to perform any of the steps of any of the Group A embodiments.

38. The communication system of the previous embodiment, wherein the cellular network further includes a base station configured to communicate with the UE.

39. The communication system of the previous 2 embodiments, wherein:
the processing circuitry of the host computer is configured to execute a host application, thereby providing the user data; and
the UE's processing circuitry is configured to execute a client application associated with the host application.

40. A method implemented in a communication system including a host computer, a base station, and a User Equipment, UE, the method comprising:
at the host computer, providing user data; and
at the host computer, initiating a transmission carrying the user data to the UE via a cellular network comprising the base station, wherein the UE performs any of the steps of any of the Group A embodiments.

41. The method of the previous embodiment, further comprising at the UE, receiving the user data from the base station.

42. A communication system including a host computer comprising:
communication interface configured to receive user data originating from a transmission from a User Equipment, UE, to a base station;
wherein the UE comprises a radio interface and processing circuitry, the UE's processing circuitry configured to perform any of the steps of any of the Group A embodiments.

43. The communication system of the previous embodiment, further including the UE.

44. The communication system of the previous 2 embodiments, further including the base station, wherein the base station comprises a radio interface configured to communicate with the UE and a communication interface configured to forward to the host computer the user data carried by a transmission from the UE to the base station.

45. The communication system of the previous 3 embodiments, wherein:
the processing circuitry of the host computer is configured to execute a host application; and
the UE's processing circuitry is configured to execute a client application associated with the host application, thereby providing the user data.

46. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

47. A method implemented in a communication system including a host computer, a base station, and a User Equipment, UE, the method comprising:
at the host computer, receiving user data transmitted to the base station from the UE, wherein the UE performs any of the steps of any of the Group A embodiments.

48. The method of the previous embodiment, further comprising, at the UE, providing the user data to the base station.

49. The method of the previous 2 embodiments, further comprising:
at the UE, executing a client application, thereby providing the user data to be transmitted; and
at the host computer, executing a host application associated with the client application.

50. The method of the previous 3 embodiments, further comprising:
at the UE, executing a client application; and
at the UE, receiving input data to the client application, the input data being provided at the host computer by executing a host application associated with the client application;
wherein the user data to be transmitted is provided by the client application in response to the input data.

51. A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

52. The communication system of the previous embodiment further including the base station.

53. The communication system of the previous 2 embodiments, further including the UE, wherein the UE is configured to communicate with the base station.

54. The communication system of the previous 3 embodiments, wherein:
the processing circuitry of the host computer is configured to execute a host application; and
the UE is configured to execute a client application associated with the host application, thereby providing the user data to be received by the host computer.

55. A method implemented in a communication system including a host computer, a base station, and a User Equipment, UE, the method comprising:
at the host computer, receiving, from the base station, user data originating from a transmission which the base station has received from the UE, wherein the UE performs any of the steps of any of the Group A embodiments.

56. The method of the previous embodiment, further comprising at the base station, receiving the user data from the UE.

57. The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).
3GPP Third Generation Partnership Project
5G Fifth Generation
AP Access Point
AS Access Stratum
ASIC Application Specific Integrated Circuit
BA Bandwidth Adaptation BCCH Broadcast Control Channel
BWP Bandwidth Part
CA Carrier Aggregation
CGI Cell Group ID
CMAS Commercial Mobile Alert System
CPU Central Processing Unit
CSI-RS Channel State Information Reference Signal
DC Dual Connectivity
DCI Downlink Channel Information
DL Downlink
DSP Digital Signal Processor
eNB Enhanced or Evolved Node B
EN-DC E-UTRAN New Radio—Dual Connectivity
ETWS Earthquake and Tsunami Warning System
E-UTRA Evolved Universal Terrestrial Access
E-UTRAN Evolved Universal Terrestrial Access Network
FPGA Field Programmable Gate Array
FR Frequency Range
FR1 Frequency Range 1
FR2 Frequency Range 2
GHz Gigahertz
gNB New Radio Base Station
IE Information Element
IP Internet Protocol
LTE Long Term Evolution
MAC Medium Access Control
MC Multi-Connectivity
MCG Master Cell Group
MGTA Measurement Gap Timing Advance
MIB Master Information Block
MME Mobility Management Entity
MN Master Node
MTC Machine Type Communication
NAS Non Access Stratum
NG-RAN Next Generation Radio Access Network
NR New Radio
NRF Network Function Repository Function
NW Network
OTT Over-the-Top
PBCH Physical Broadcasting Channel
PCCH Paging Control Channel
PDCCH Physical Downlink Control Channel
PDSCH Physical Downlink Shared Channel
P-GW Packet Data Network Gateway
PLMN Public Land Mobile Network
PO Paging Occasion
PRACH Physical Random Access Channel
P-RNTI Paging Radio Network Temporary Identifier
PWS Public Warning System
RACH Random Access Channel
RAM Random Access Memory
RAN Radio Access Network
RAT Radio Access Technology
RLC Radio Link Control
RNC Radio Network Controller
ROM Read Only Memory
RRC Radio Resource Control
RRH Remote Radio Head
RRU Remote Radio Unit
RSRP Reference Signal Received Power
RSRQ Reference Signal Received Quality
SCEF Service Capability Exposure Function
SCG Secondary Cell Group
SFN System Frame Number
SI System Information
SIB System Information Block
SMTC SS/PBCH block Measurement Timing Configuration
SN Secondary Node
SRB Signaling Radio Bearer
SS Synchronization Signal
SSB Synchronization Signal Block
TDD Time Division Duplexing
TM Transmission Mode
TS Technical Specification
UE User Equipment
UL Uplink
USB Universal Serial Bus Those skilled in the art will recognize improvements and modifications to the embodiments of the present disclosure. All such improvements and modifications are considered within the scope of the concepts disclosed herein.

What is claimed is:

1. A method performed by a wireless device for performing measurements where a current Radio Resource Control (RRC) status is one of the group consisting of IDLE and INACTIVE, the method comprising:
   monitoring for a potential reception of a downlink message in a cell that the wireless device is camping on;
   detecting, based upon the reception of the downlink message, information regarding performing the measurements, the information including a received measurement configuration;
   applying the received measurement configuration on top of a measurement configuration stored in the wireless device by:
      applying the received measurement as a delta of the stored measurement configuration; or
      applying the received measurement configuration as a full configuration;
   performing the measurements based on the information regarding performing the measurements; and
   reporting measurement results.

2. The method of claim 1, wherein the potential reception of the downlink message is a potential reception of one of the group consisting of: a paging message; and a message multiplexed with the paging message.

3. The method of claim 1, wherein the potential reception of the downlink message is a potential reception of one of the group consisting of: a Physical Downlink Control Channel (PDCCH) message; and a Physical Downlink Shared Channel (PDSCH) message.

4. The method of claim 1, wherein the received measurement configuration comprises one or more of the group consisting of: one or more lists of measurement objects; one or more report configurations; one or more measurement identifiers; and associations between any two or more of any of measurement objects, report configurations, and measurement identifiers.

5. The method of claim 1, further comprising:
   restoring the stored measurement configuration, in response to a received indication being to restore the measurement configuration.

6. The method of claim 1, wherein the delta comprises one of the group consisting of: an addition; and a removal.

7. The method of claim 1, wherein whether the received measurement configuration is applied as the delta or the received measurement configuration is applied as the full configuration is based on a need code structure in a MeasConfig IE.

8. The method of claim 1, wherein the measurements are performed before security is activated and the measurement results are reported after security is activated.

9. A method performed by a base station for enabling measurements for a wireless device where a current Radio Resource Control (RRC) status of the wireless device is one of the group consisting of: IDLE; and INACTIVE, the method comprising:
- determining whether or not to enable the measurements for the wireless device;
- sending an indication to start the measurements to the wireless device camping on a cell of the base station, the indication including a measurement configuration to be applied on top of a measurement configuration stored in the wireless device, the indication indicating one of the following:
  - the included measurement configuration to be applied as a delta of the stored measurement configuration; or
  - the included measurement configuration to be applied as a full configuration; and
- receiving measurement results from the wireless device performed before reception of a resume message.

10. The method of claim 9, wherein sending the indication to start the measurements comprises sending one of the group consisting of: a paging message; and a message multiplexed with the paging message.

11. The method of claim 9, wherein sending the indication to start the measurements comprises sending one of the group consisting of: a Physical Downlink Control Channel (PDCCH) message; and a Physical Downlink Shared Channel (PDSCH) message.

12. The method of claim 9, wherein the included measurement configuration comprises one or more of the group consisting of: one or more lists of measurement objects; one or more report configurations; one or more measurement identifiers; and associations between these.

13. The method of claim 9, wherein the indication comprises an indication to restore the measurement configuration.

14. The method of claim 9, wherein the delta comprises one of the group consisting of: an addition; and a removal.

15. The method of claim 9, wherein whether the included measurement configuration is applied as the delta or the included measurement configuration is applied as the full configuration is based on a need code structure in a MeasConfig Information Element (IE).

16. The method of claim 9, wherein the measurements are performed before security is activated and the measurement results are received after security is activated.

17. A wireless device for performing measurements where a current Radio Resource Control (RRC) status is one of the group consisting of IDLE and INACTIVE, the wireless device comprising:
- one or more processors; and
- memory comprising instructions to cause the wireless device to:
  - monitor for a potential reception of a downlink message in a cell that the wireless device is camping on;
  - detect, based upon the reception of the downlink message, information regarding performing the measurements, the information including a received measurement configuration;
  - apply the received measurement configuration on top of a measurement configuration stored in the wireless device by:
    - apply the received measurement as a delta of the stored measurement configuration; or
    - apply the received measurement configuration as a full configuration;
  - perform the measurements based on the information regarding performing the measurements; and
  - report measurement results.

18. A base station for enabling measurements for a wireless device where a current Radio Resource Control (RRC) status of the wireless device is one of the group consisting of IDLE and INACTIVE, the base station comprising:
- one or more processors; and
- memory comprising instructions to cause the base station to:
  - determine whether or not to enable the measurements for the wireless device;
  - send an indication to start the measurements to the wireless device camping on a cell of the base station, the indication including a measurement configuration to be applied on top of a measurement configuration stored in the wireless device, the indication indicating one of the following:
    - the included measurement configuration to be applied as a delta of the stored measurement configuration; or
    - the included measurement configuration to be applied as a full configuration; and
  - receive measurement results from the wireless device performed before reception of a resume message.

* * * * *

UNITED STATES PATENT AND TRADEMARK OFFICE
CERTIFICATE OF CORRECTION

PATENT NO. : 11,956,660 B2  
APPLICATION NO. : 17/429820  
DATED : April 9, 2024  
INVENTOR(S) : Orsino et al.

Page 1 of 2

It is certified that error appears in the above-identified patent and that said Letters Patent is hereby corrected as shown below:

In the Drawings

In Fig. 7, Sheet 6 of 17, and on the title page, the illustrative print figure, delete "RRConnectionRelease" and insert -- RRCConnectionRelease --, therefor.

In the Specification

In Column 4, Line 3, delete "device (UE)" and insert -- (UE) device --, therefor.

In Column 14, Lines 19-20, delete "Time Configuration (smtc)" and insert -- Timing Configuration (SMTC) --, therefor.

In Columns 21 & 22, in Table "Paging message", Line 17, delete "fullI-RNTI" and insert -- full-RNTI --, therefor.

In Column 23, Line 22, delete "(SIB1)" and insert -- (SIB) --, therefor.

In Column 24, Line 17, delete "Channel" and insert -- Control --, therefor.

In Column 25, Line 38, delete "Duplexing" and insert -- Duplex --, therefor.

In Column 34, Line 36, delete "full-ANTI:" and insert -- full-RNTI: --, therefor.

In Columns 35 & 36, in Table "Paging message", Line 22, delete "fullI-RNTI" and insert -- full-RNTI --, therefor.

In Columns 39 & 40, in Table "Paging message", Line 16, delete "measConfig M" and insert -- measConfig --, therefor.

Signed and Sealed this  
Twenty-second Day of October, 2024

Katherine Kelly Vidal  
*Director of the United States Patent and Trademark Office*

CERTIFICATE OF CORRECTION (continued)
U.S. Pat. No. 11,956,660 B2

In Columns 39 & 40, in Table "Paging message", Line 16, delete "Need" and insert -- Need M --, therefor.

In Columns 39 & 40, in Table "Paging message", Line 21, delete "fullI-RNTI" and insert -- full-RNTI --, therefor.

In Columns 39 & 40, in Table "MeasConfig information element", Line 6, delete "MeasObjectToRemoveList" and insert -- MeasObjectToAddModList --, therefor.

In Columns 43 & 44, in Table "-continued", Line 18, delete "fullI-RNTI" and insert -- full-RNTI --, therefor.

In Column 55, Line 9, delete "Channel" and insert -- Control --, therefor.

In Column 55, Line 15, delete "Access" and insert -- Radio Access --, therefor.

In Column 55, Line 16, delete "Access" and insert -- Radio Access --, therefor.

In Column 55, Line 38, delete "Network Function" and insert -- Network --, therefor.

In Column 56, Line 7, delete "Duplexing" and insert -- Duplex --, therefor.